US012219317B2

(12) United States Patent
Li et al.

(10) Patent No.: US 12,219,317 B2
(45) Date of Patent: Feb. 4, 2025

(54) LOUDSPEAKER APPARATUS

(71) Applicant: SHENZHEN SHOKZ CO., LTD., Guangdong (CN)

(72) Inventors: Chaowu Li, Shenzhen (CN); Zhuyang Jiang, Shenzhen (CN); Fen You, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 18/451,136

(22) Filed: Aug. 17, 2023

(65) Prior Publication Data

US 2023/0396915 A1 Dec. 7, 2023

Related U.S. Application Data

(63) Continuation of application No. 17/661,283, filed on Apr. 28, 2022, now Pat. No. 11,736,852, which is a
(Continued)

(30) Foreign Application Priority Data

Jan. 5, 2019 (CN) ........................ 201910009887.3

(51) Int. Cl.
*H04R 1/10* (2006.01)
*H04R 1/02* (2006.01)
*H04R 1/28* (2006.01)

(52) U.S. Cl.
CPC ........... *H04R 1/1041* (2013.01); *H04R 1/026* (2013.01); *H04R 1/10* (2013.01); *H04R 1/1008* (2013.01);
(Continued)

(58) Field of Classification Search
CPC ........ H04R 1/1041; H04R 1/026; H04R 1/10; H04R 1/1008; H04R 1/105; H04R 1/1066;
(Continued)

(56) References Cited

U.S. PATENT DOCUMENTS 4,791,819 A * 12/1988 Goschke ................ H04R 25/70 73/865.8
5,226,904 A * 7/1993 Gentelia ............ A61B 18/1402 606/49
(Continued)

FOREIGN PATENT DOCUMENTS

CN 201259657 Y 6/2009
CN 202488645 U 10/2012
(Continued)

OTHER PUBLICATIONS

International Search Report in PCT/CN2019/102409 mailed on Nov. 28, 2019, 8 pages.
(Continued)

*Primary Examiner* — Andrew Sniezek
(74) *Attorney, Agent, or Firm* — METIS IP LLC

(57) ABSTRACT

The present disclosure discloses a loudspeaker apparatus. The loudspeaker apparatus comprises a core housing for accommodating the earphone core; a circuit housing for accommodating a control circuit that drives the earphone core to vibrate to generate a sound, wherein the sound includes at least two resonance peaks; an ear hook for connecting the core housing and the circuit housing; a key arranged at a keyhole on the circuit housing, wherein the key moves relative to the keyhole to generate a control signal for the control circuit; and an elastic pad arranged between the key and the keyhole, wherein the elastic pad hinders a movement of the key towards the keyhole. In the present disclosure, by providing an elastic pad between the key and
(Continued)

the keyhole, the waterproof effect of the loudspeaker apparatus may be improved, and the space occupied by the key may be reduced.

18 Claims, 24 Drawing Sheets

Related U.S. Application Data continuation of application No. 17/138,924, filed on Dec. 31, 2020, now Pat. No. 11,336,988, which is a continuation of application No. PCT/CN2019/102409, filed on Aug. 24, 2019.

(52) U.S. Cl.
CPC ........... *H04R 1/105* (2013.01); *H04R 1/1066* (2013.01); *H04R 1/1075* (2013.01); *H04R 1/1091* (2013.01); *H04R 1/28* (2013.01); *H04R 2460/13* (2013.01)

(58) Field of Classification Search
CPC ...... H04R 1/1075; H04R 1/1091; H04R 1/28; H04R 2460/13
See application file for complete search history.

(56) References Cited

U.S. PATENT DOCUMENTS

| | | | | |
|---|---|---|---|---|
| 5,704,467 | A | 1/1998 | Jarvis | |
| 10,117,026 | B2 | 10/2018 | Qi et al. | |
| 10,609,496 | B2 | 3/2020 | Liao et al. | |
| 11,336,988 | B2 | 5/2022 | Li et al. | |
| 2008/0132292 | A1* | 6/2008 | Hansen | H04R 1/326 455/569.1 |
| 2014/0254848 | A1 | 9/2014 | Petterson et al. | |
| 2019/0014425 | A1* | 1/2019 | Liao | H04R 9/066 |
| 2021/0142962 | A1 | 5/2021 | Choi et al. | |
| 2021/0211795 | A1 | 7/2021 | Wang et al. | |

FOREIGN PATENT DOCUMENTS

| | | | |
|---|---|---|---|
| CN | 204067124 | U | 12/2014 |
| CN | 204360945 | | 5/2015 |
| CN | 204442871 | U | 7/2015 |
| CN | 105007551 | A | 10/2015 |
| CN | 105246282 | A | 1/2016 |
| CN | 207039848 | | 2/2018 |
| CN | 207070281 | U | 3/2018 |
| CN | 107948883 | A | 4/2018 |
| CN | 108231462 | | 6/2018 |
| CN | 209184800 | U | 7/2019 |
| KR | 101934229 | 81 | 12/2018 |
| TW | 201419337 | A | 5/2014 |

OTHER PUBLICATIONS

Written Opinion in PCT/CN2019/102409 mailed on Nov. 28, 2019, 12 pages.

* cited by examiner

LOUDSPEAKER APPARATUS

CROSS-REFERENCE TO RELATED APPLICATIONS

The present disclosure is a continuation of U.S. patent application Ser. No. 17/661,283, filed on Apr. 28, 2022, which is a continuation of U.S. patent application Ser. No. 17/138,924 (now U.S. Pat. No. 11,336,988), filed on Dec. 31, 2020, which is a Continuation of International Patent Application No. PCT/CN2019/102409, filed on Aug. 24, 2019, which claims priority of Chinese Patent Application No. 201910009887.3, filed on Jan. 5, 2019, the entire contents of each of which are incorporated herein by reference.

TECHNICAL FIELD

The present disclosure relates to a loudspeaker apparatus, and in particular, to a loudspeaker apparatus with waterproof function.

BACKGROUND

In general, people can hear the sound because air transmits vibration to the eardrum through the external ear canal, and the vibration formed by the eardrum drives the human auditory nerve, thereby perceiving the vibration of the sound. At present, earphones are widely used in people's lives. For example, users can use earphones to play music, answer calls, etc. Earphones have become an important item in people's daily life. Ordinary earphones can no longer meet the normal use of users in some special scenes, for example, in scenes such as swimming, rainy days, etc. that users need to control the earphones by keys. Thus, earphones with waterproof function and better sound quality are more popular with consumers. Therefore, it is necessary to provide a loudspeaker apparatus with a waterproof function.

SUMMARY

One aspect of the present disclosure provides a loudspeaker apparatus, which may include: a core housing configured to accommodate an earphone core; a circuit housing configured to accommodate a control circuit that drives the earphone core to vibrate to generate a sound, and the sound includes at least two resonance peaks; an ear hook configured to connect the core housing and the circuit housing; a key arranged at a keyhole on the circuit housing, and the key moves relative to the keyhole to generate a control signal for the control circuit; and an elastic pad arranged between the key and the keyhole, and the elastic pad blocks a movement of the key toward the keyhole.

In some embodiments, the circuit housing further includes a main sidewall and an auxiliary sidewall connected to the main sidewall, wherein, an outer surface of the auxiliary sidewall is arranged with a first recessed region, the elastic pad is located in the first recessed region, and the elastic pad includes a second recessed region corresponding to the keyhole, and the second recessed region extends into the keyhole.

In some embodiments, the key comprises a key body and a key contact, wherein the key contact extends into the second recessed region, and the key body is arranged on a side of the key contact away from the elastic pad.

In some embodiments, the circuit housing further accommodates a key circuit board, and a key switch corresponding to the keyhole is arranged on the key circuit board to allow the key contact contacts and triggers the key switch when a user presses the key.

In some embodiments, the key comprises at least two key units spaced apart from each other and a connection component for connecting the key units, wherein each of the key units is arranged with one key contact correspondingly, and the elastic pad is also arranged with an elastic bump for supporting the connection component.

In some embodiments, the loudspeaker apparatus further comprises a rigid pad, the rigid pad is arranged between the elastic pad and the circuit housing, and is arranged with a passing hole that allows the second recessed region to pass through.

In some embodiments, the elastic pad and the rigid pad are fixed against each other.

In some embodiments, the ear hook is plugged and fixed to the circuit housing, and a housing sheath is molded on the ear hook, wherein the housing sheath is integrally covered around the circuit housing and the key.

In some embodiments, the housing sheath has a bag-like structure with one end open so that the circuit housing and the key enter into the housing sheath through the open end of the housing sheath.

In some embodiments, the open end of the housing sheath is arranged with an annular flange protruding inward, and an end of the circuit housing away from the ear hook is arranged in a stepped shape so as to further form an annular table surface, the annular flange abuts on the annular table surface when the housing sheath is covered around the periphery of the circuit housing.

In some embodiments, a sealant is applied to a joint area between the annular flange and the annular table surface so as to form a sealed connection between the housing sheath and the circuit housing.

In some embodiments, the loudspeaker apparatus further includes an auxiliary sheet, wherein the auxiliary sheet comprises a board and a pressing foot protruding from the board, the pressing foot is configured to press the key circuit board on an inner surface of the auxiliary sidewall.

In some embodiments, the main sidewall of the circuit housing is arranged with at least one mounting hole, and the loudspeaker apparatus further comprises a conductive pin inserted into the mounting hole. The board is arranged with a hollow region, wherein the board is arranged on an inner surface of the main sidewall, and the mounting hole is located inside the hollow region, so as to form a glue groove around the conductive pin.

In some embodiments, the hollow region is arranged with a gap, and a strip-shaped rib corresponding to the gap is integrally formed on the inner surface of the main sidewall, so that the strip-shaped rib cooperates with the auxiliary sheet to make the glue groove closed.

In some embodiments, the earphone core includes at least a composite vibration component composed of a vibration plate and a second vibration conductive plate, and the composite vibration component generates the two resonance peaks.

In some embodiments, the earphone core further includes at least one voice coil and at least one magnetic circuit system, wherein the voice coil is physically connected to the vibration plate, and the magnetic circuit system is physically connected to the second vibration conductive plate.

In some embodiments, a stiffness coefficient of the vibration plate is greater than a stiffness coefficient of the second vibration conductive plate.

In some embodiments, the earphone core further includes a first vibration conductive plate, wherein the first vibration conductive plate is physically connected to the composite vibration component; the first vibration conductive plate is physically connected to the core housing; and the first vibration conductive plate generates another resonance peak.

In some embodiments, the two resonance peaks are both within a frequency range perceivable by human ears.

In some embodiments, the core housing further includes at least one contact area, and the contact area is at least partially in contact with a user directly or indirectly; wherein the contact area has a gradient structure so that a pressure distribution on the contact area is uniform.

In some embodiments, the gradient structure includes at least one convex or at least one groove.

In some embodiments, the gradient structure is located at the center or edge of the contact area.

In some embodiments, the core housing further includes at least one contact area, and the contact area is at least partially in contact with a user directly or indirectly; wherein the contact area includes at least a first contact area region and a second contact area region, and the second contact area region has a higher degree of convex than the first contact area region.

In some embodiments, the first contact area region includes a sound guiding hole, the sound guiding hole guides sound waves in the core housing out, and the sound waves are superimposed with leakage sound waves generated by vibrations of the core housing to reduce sound leakage.

In some embodiments, the first contact area region and the second contact area region are made of plastics including silica gel, rubber, or plastic cement.

In some embodiments, the loudspeaker apparatus further includes an indicator lamp. The indicator lamp is located on the core housing or the circuit housing, and is configured to display the status of the loudspeaker apparatus.

BRIEF DESCRIPTION OF THE DRAWINGS

The present disclosure is further described in terms of exemplary embodiments. These exemplary embodiments are described in detail with reference to the drawings. These examples are non-limiting exemplary embodiments, in which like reference numerals represent similar structures throughout the several views of the drawings, and where.

DETAILED DESCRIPTION

Figure 1:
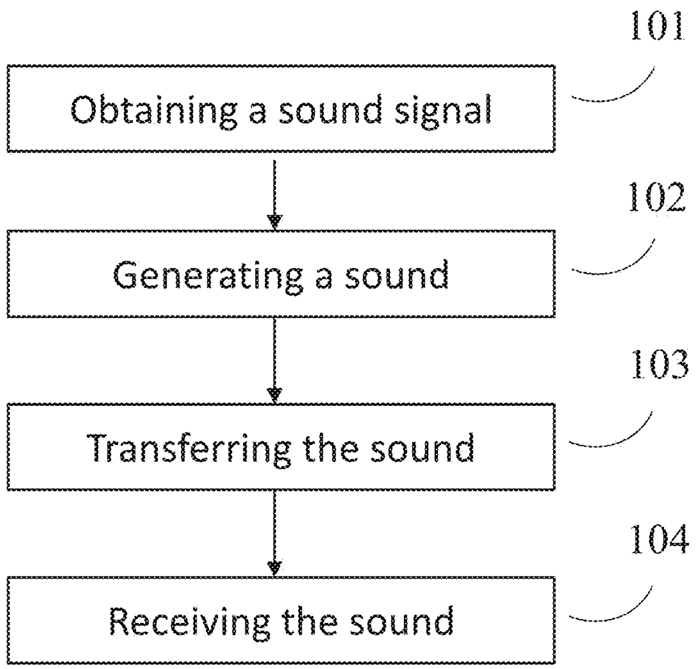
FIG. 1 is a process for a loudspeaker apparatus making a user's ears generate auditory sense.

In order to illustrate the technical solutions related to the embodiments of the present disclosure, a brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless apparent from the locale or otherwise stated, like reference numerals represent similar structures or operations throughout the several views of the drawings.

As used in the disclosure and the appended claims, the singular forms "a," "an," and/or "the" may include plural forms unless the content clearly indicates otherwise. In general, the terms "comprise" and "include" are indicated to include steps and elements that have been clearly identified, and these steps and elements do not constitute an exclusive list. The methods or devices may also include other steps or elements. The term "based on" refers to"at least in part based on." The term "one embodiment" refers to "at least one embodiment," and the term "another embodiment" refers to "at least one another embodiment." Definitions of other terms will be given in the description below. In the following, without loss of generality, in the description of the present disclosure regarding sound conduction-related technologies, a description of "player," "loudspeaker apparatus," "loudspeaker component" or "loudspeaker" will be used. The description is only a form of application of sound conduction. For those of ordinary skill in the art, "player," "playing device," "loudspeaker," "loudspeaker apparatus" or "hearing aid" can also be replaced by other similar words. In fact, various implementations in the present disclosure may be easily applied to other non-speaker-type hearing devices. For example, for those skilled in the art, after understanding the basic principles of loudspeaker apparatus, various modifications and changes can be made in the forms and details of the specific ways and operations of implementing the loudspeaker apparatus without departing from the principle. In particular, a function of picking up and processing environmental sound is added to the loudspeaker apparatus, so that the loudspeaker apparatus achieves the function of a hearing aid. For example, in the case of using a bone conductive loudspeaker, adding microphones that may pick up environmental sound surrounding a user/wearer, and the microphones may send the processed sound (e.g., the generated electrical signals) to the bone conductive loudspeaker module with a certain algorithm. That is, the bone conductive speaker may be modified to include the function of picking up environmental sound, and after a certain signal processing, the sound is transmitted to the user/wearer through the bone conductive loudspeaker module, so as to realize the function of a bone conductive hearing aid. In some embodiments, the algorithm mentioned above may include noise elimination, automatic gain control, acoustic feedback suppression, wide dynamic range compression, active environment recognition, active anti-noise, directional processing, tinnitus processing, multi-channel wide dynamic range compression, active howling suppression, volume control, or the like, or any combination thereof.

FIG. 1 is a process for a loudspeaker apparatus making a user's ears generate auditory sense. The loudspeaker apparatus may transfer sound to an auditory system through bone conduction or air conduction by a built-in loudspeaker, and an auditory sense may be generated. As shown in FIG. 1, the process of making human ears hear the sound by a loudspeaker apparatus mainly includes the following operations.

In operation 101, the loudspeaker apparatus may acquire or generate a signal containing sound information. In some embodiments, the sound information may refer to a video file or an audio file with a specific data format, and may refer to general data or files which may be converted to be sound through specific approaches eventually. In some embodiments, the signal containing sound information may be received from a storage unit of a loudspeaker apparatus itself, or may be received from an information generation system, a storage system, or a delivery system outer of the loudspeaker apparatus. The sound signal discussed herein are not limited to an electrical signal, and may also include other forms of signals other than the electrical signal, such as an optical signal, a magnetic signal, a mechanical signal, or the like. In principle, as long as the signal includes information that can be used to generate sounds by the loudspeaker apparatus, the signal may be processed as a sound signal. In some embodiments, the signal may not be limited to one signal source, and it may come from multiple signal sources. The multiple signal sources may be independent of or dependent on each other. In some embodiments, approaches to generating or transmitting the sound signal may be wired or wireless, and may be real-time or time-delayed. For example, a loudspeaker apparatus may receive an electrical signal containing sound information via a wired or wireless connection, or may obtain data directly from a storage medium and generate a sound signal. Taking bone conduction technology as an example, components with sound collection function may be added to a bone conductive loudspeaker. The bone conductive loudspeaker may pick up sound from the ambient environment and may convert the mechanical vibration of the sound into an electric signal. Then the electric signal may be processed through an amplifier to meet special requirements. The wired connection may include but not limited to metal cables, optical cables, or hybrid cables of metal and optical, such as coaxial cables, communication cables, flexible cables, spiral cables, non-metallic sheathed cables, metallic-sheathed cables, multi-core cables, twisted pair cables, ribbon cables, shielded cables, telecommunications cables, double-stranded cables, parallel twin-core wires, and twisted pairs. Examples described above are only used for illustration purposes, and the wired connection may also include other types, such as other types of transmission carriers for electrical or optical signal.

The storage device or storage unit mentioned herein includes a direct attached storage, a network attached storage, a storage area network, and other storage systems. The storage device includes but not limited to common types of storage devices such as a solid-state storage device (a solid-state drive, a solid-state hybrid drive, etc.), a mechanical hard drive, a USB flash drive, a memory stick, a storage card (e.g., CF, SD, etc.), and other drivers (e.g., CD, DVD, HD DVD, Blu-ray, etc.), a random access memory (RAM), and a read-only memory (ROM), etc. The RAM includes but not limited to a decimal counter, a selection tube, a delay line memory, a Williams tube, a dynamic random access memory (DRAM), a static random access memory (SRAM), a thyristor random access memory (T-RAM), a zero capacitive random access memory (Z-RAM), etc. The ROM includes but not limited to a magnetic bubble memory, a magnetic button line memory, a thin-film memory, a magnetic plating line memory, a magnetic core memory, a drum memory, an optical disk driver, a hard disk, a magnetic tape, an early NVRAM (non-volatile memory), a phase change memory, a magneto-resistive random access memory, a ferroelectric random access memory, a non-volatile SRAM, a flash memory, an electronically erasable and rewritable read-only memory, an erasable and programmable read-only memory (EPROM), a programmable read-only memory (PROM), a shielded heap read memory, a floating connection gate random access memory, a nano random access memory, a racetrack memory, a variable resistance memory, a programmable metallization unit, etc. The storage device/storage unit mentioned above are merely some examples, the storage medium used in the storage device/storage unit is not limited.

In operation 102, the loudspeaker apparatus may convert the signal containing sound information into vibrations, and a sound may be generated. The loudspeaker apparatus may use a specific transducer to convert a signal into mechanical vibrations accompanying with energy conversion. The conversion process may include multiple types of energy coexistence and conversion. For example, the electrical signal may be directly converted into mechanical vibrations by the transducer to generate a sound. As another example, the sound information may be included in an optical signal, which may be converted into mechanical vibrations by a specific transducer. Other types of energy that may be converted and coexisted when the transducer works may include thermal energy, magnetic field energy, or the like. In some embodiments, energy conversion modes of the transducer include but are not limited to, a moving coil type, an electrostatic type, a piezoelectric type, a moving iron type, a pneumatic type, an electromagnetic type, or the like. The frequency response range and sound quality of the loudspeaker apparatus may be affected by the energy conversion mode and the property of each physical component of the transducer. For example, in the moving coil transducer, as a wound cylindrical coil is connected to a vibration plate, the coil driven by a signal current drives the vibration plate to vibrate in the magnetic field, and generate a sound. Factors, such as material expansion and contraction, folds deformation, size, shape, and fixed manner of the vibration plate, the magnetic density of the permanent magnet, etc., may have a large impact on the sound quality of the loudspeaker apparatus.

The term “sound quality” used herein may indicate the quality of sound, which refers to an audio fidelity after post-processing, transmission, or the like. In an audio device, the sound quality may include audio intensity and magnitude, audio frequency, audio overtone, or harmonic components, or the like. When the sound quality is evaluated, measuring methods and the evaluation criteria for objectively evaluating the sound quality may be used, other methods that combine different elements of sound and subjective feelings for evaluating various properties of the sound quality may also be used, thus the sound quality may be affected during the processes of generating the sound, transmitting the sound, and receiving the sound.

In operation 103, the sound is delivered by a delivery system. In some embodiments, the delivery system refers to a substance that can deliver vibration signals containing sound information, such as the skull, bony labyrinth, inner ear lymph, and spiral organs of humans or/and animals with auditory systems. As another example, the delivery system also refers to a medium that may transmit sound (for example, air and liquid). Merely by way of example to illustrate the process of transmitting sound information by the delivery system, a bone conductive loudspeaker is taken as an example. The bone conductive loudspeaker may directly transmit sound waves (vibration signals) converted from electrical signals to an auditory center through bones. In addition, the sound waves may be transmitted to the auditory center through air conduction. For the content of air conduction, please refer to the specific description elsewhere in the specification.

In operation 104, the sound information is transferred to a sensing terminal. Specifically, the sound information is transmitted to the sensing terminal through the delivery system. In a working scenario, the loudspeaker apparatus picks up or generates a signal containing sound information and converts the sound information into a sound vibration by the transducer. Then the loudspeaker apparatus transmits the sound to the sensing terminal by the delivery system, and finally a user can hear the sound. Generally speaking, the subject of the sensing terminal, the auditory system, the sensory organ, etc., described above may be a human or an animal with an auditory system. It should be noted that the following description of the loudspeaker apparatus used by a human does not constitute a restriction on the use scene of the loudspeaker apparatus, and similar descriptions may also be applied to other animals.

The above description of the process of the loudspeaker apparatus is only a specific example, and should not be regarded as the only feasible implementation. Obviously, for persons having ordinary skills in the art, after understanding the basic principle of the loudspeaker apparatus, various modifications and changes may be made in the form and details of the specific ways and steps of implementing the loudspeaker apparatus without departing from the principle, but these modifications and changes are still within the scope of the present disclosure.

Figure 2:
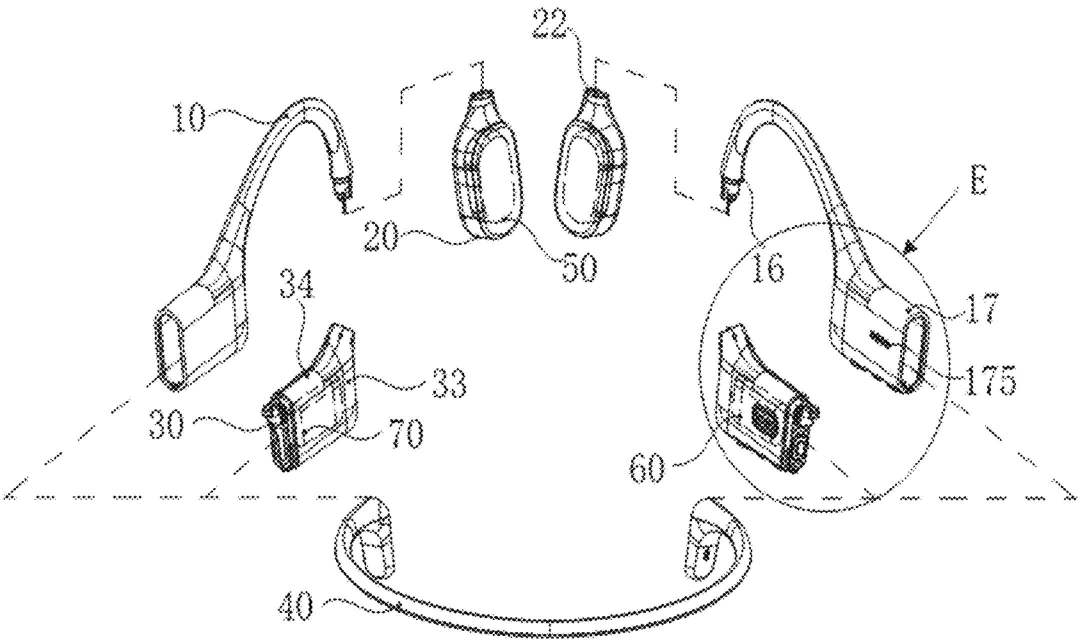
FIG. 2 is a structural diagram of a loudspeaker apparatus according to some embodiments of the present disclosure.

The loudspeaker apparatus in the present disclosure may be based on earphones, MP3 players, hearing aids, or other devices with speaker function. In the following specific embodiments of the present disclosure, an MP3 player is taken as an example to describe the loudspeaker apparatus in detail. FIG. 2 is a structural diagram of a loudspeaker apparatus according to some embodiments of the present disclosure. As shown in FIG. 2, in some embodiments, the MP3 player may include an ear hook 10, a core housing 20, a circuit housing 30, a rear hook 40, an earphone core 50, a control circuit 60, and a battery 70. The core housing 20 and the circuit housing 30 are arranged at two ends of the ear hook 10 respectively, and the rear hook 40 is arranged at an end of the circuit housing 30 away from the ear hook 10. The number of the core housings 20 is two, which are used to accommodate two earphone cores 50, respectively. The number of the circuit housings 30 is also two, which are used to accommodate the control circuit 60 and the battery 70, respectively. The two ends of the rear hook 40 are connected to the corresponding circuit housings 30, respectively.

Figure 3:
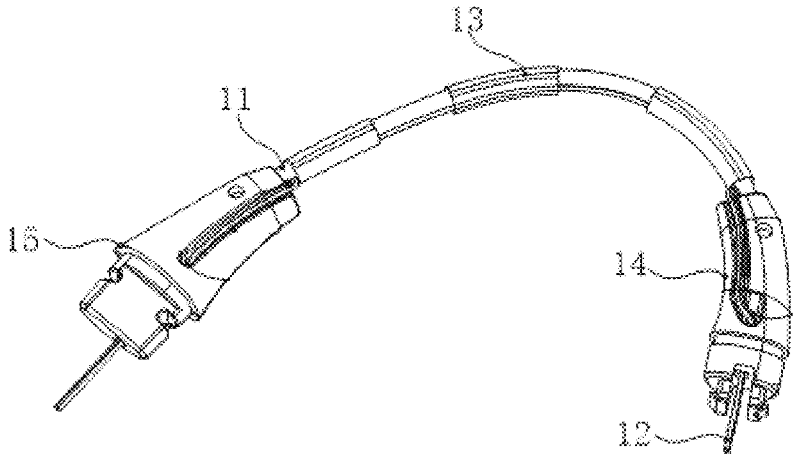
FIG. 3 is a partial structural diagram of an ear hook in an MP3 player according to some embodiments of the present disclosure.
Figure 4:
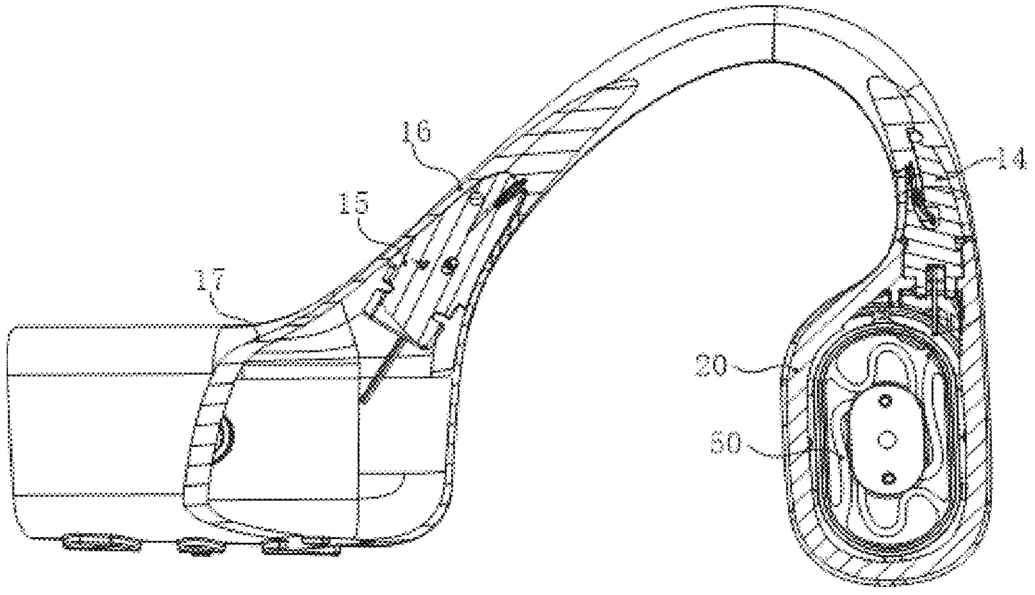
FIG. 4 is a partial sectional view of an MP3 player according to some embodiments of the present disclosure.

FIG. 3 is a partial structural diagram of an ear hook in an MP3 player according to some embodiments of the present disclosure. FIG. 4 is a partial sectional view of an MP3 player according to some embodiments of the present disclosure. Referring FIG. 2, FIG. 3, and FIG. 4, in some embodiments, the ear hook 10 includes an elastic metal wire 11, a wire 12, a fixed sleeve 13, and a plug-in end 14 and a plug-in end 15 arranged at both ends of the elastic metal wire 11. In some embodiments, the ear hook 10 may further include a protective sleeve 16 and a housing sheath 17 integrally formed with the protective sleeve 16. The protective sleeve 16 may be formed by injection molding around the periphery of the elastic metal wire 11, the wire 12, the fixed sleeve 13, the plug-in end 14, and the plug-in end 15, so as to connect the protective sleeve 16 to the elastic metal wire 11, the wire 12, the fixed sleeve 13, the plug-in end 14, and the plug-in end 15, and there is no need to form the protective sleeve 16 separately by injection molding and then further wrap it around the periphery of the elastic metal wire 11, the plug-in end 14, and the plug-in end 15, thereby simplifying the production and assembly processes. Additionally, in this way, the fixing of the protective sleeve 16 may be more secure and stable.

In some embodiments, when forming the protective sleeve 16, the protective sleeve 16 is integrally formed with the housing sheath 17 disposed on the side close to the plug-in end 15. In some embodiments, the housing sheath 17 may be integrally formed with the protective sleeve 16 to form a whole, and the circuit housing 30 may be connected to the one end of the ear hook 10 by being fixed to the plug-in end 15. A socket 22 of the core housing 20 may be connected to the other end of the ear hook 10 by being fixed to the plug-in end 14. The housing sheath 17 may be integrally covered around the circuit housing 30. In some embodiments, the protective sleeve 16 and the housing sheath 17 may be made of soft materials with a certain elasticity, such as soft silica gel, rubber, or the like. In some embodiments, the housing sheath 17 may be a bag-like structure with one end open, so that the circuit housing 30 enters into the housing sheath 17 through the open end of the housing sheath 17. Specifically, the open end of the housing sheath 17 is the end of the housing sheath 17 deviated from the protective sleeve 16 so that the circuit housing 30 enters into the housing sheath 17 through the end of the housing sheath 17 away from the protective sleeve 16 to be covered by the housing sheath 17.

Figure 5:
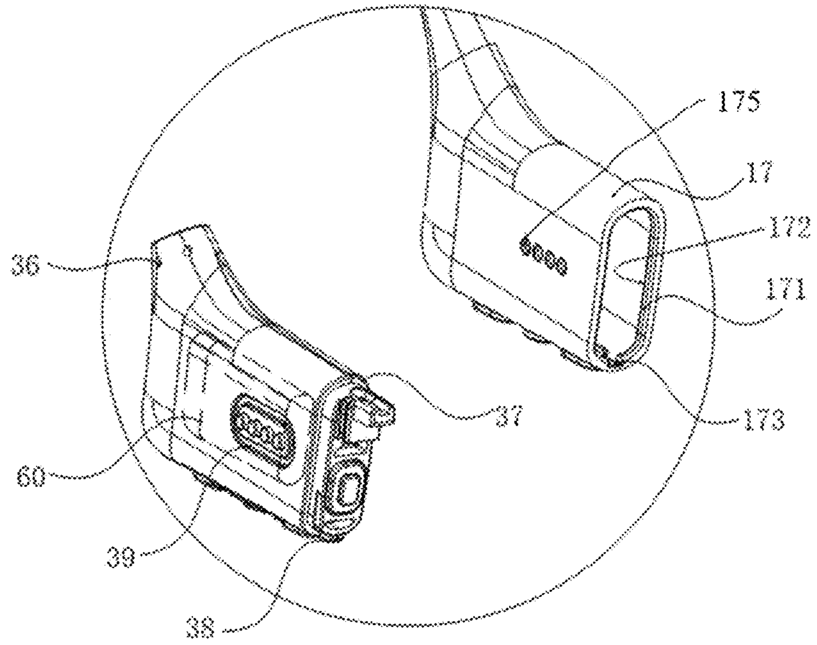
FIG. 5 is a partial enlarged view of part E in FIG. 2.

FIG. 5 is a partial enlarged view of part E in FIG. 2. Combing FIG. 2 and FIG. 5, in some embodiments, the open end of the housing sheath 17 is arranged with a protruding annular flange 171 protruding inward. The end of the circuit housing 30 away from the ear hook 10 is arranged in a stepped shape, so as to form an annular table surface 37. The annular flange 171 abuts on the annular table surface 37 when the housing sheath 17 is covered around the circuit housing 30. The annular flange 171 is formed by the inner wall surface of the open end of the housing sheath 17 protruding to a certain thickness toward the inside of the housing sheath 17. The annular flange 171 includes a flange surface 172 facing the ear hook 10. The annular table surface 37 is opposite to the flange surface 172 and towards a direction of the circuit housing 30 away from the ear hook 10. The height of the flange surface 172 of the annular flange 171 is not greater than the height of the annular table surface 37, so that the inner wall surface of the housing sheath 17 can fully abut the sidewall of the circuit housing 30 when the flange surface 172 of the annular flange 171 abuts the annular table surface 37. Therefore, the housing sheath 17 may tightly cover the periphery of the circuit housing 30. In some embodiments, a sealant may be applied to a joint area between the annular flange 171 and the annular table surface 37. Specifically, when the housing sheath 17 is sheathed, the sealant may be coated on the annular table surface 37 to seal the housing sheath 17 and the circuit housing 30.

In some embodiments, the circuit housing 30 is further arranged with a positioning block 38. The positioning block 38 is arranged on the annular table surface 37 and extends along with the circuit housing 30 away from the ear hook 10. Specifically, the positioning block 38 may be disposed on the auxiliary sidewall 34 of the circuit housing 30, and the thickness of the positioning block 38 protruding on the auxiliary sidewall 34 is consistent with the height of the annular table surface 37. The number of positioning blocks 38 may be set according to requirements. Correspondingly, the annular flange 171 of the housing sheath 17 is arranged with a positioning groove 173 corresponding to the positioning block 38, so that the positioning groove 173 covers at least part of the positioning block 38 when the housing sheath 17 covers the periphery of the circuit housing 30.

Figure 6:
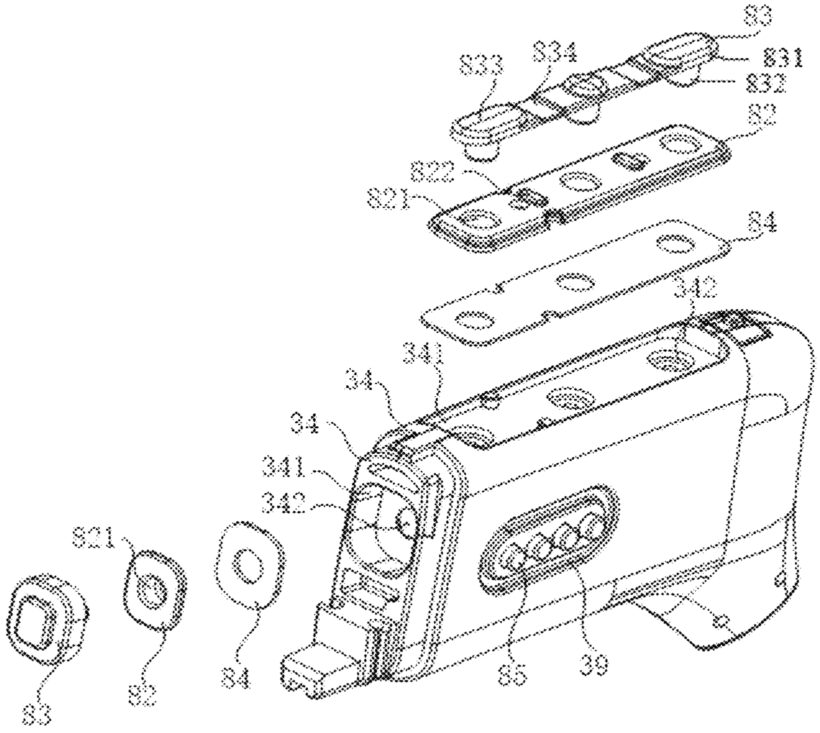
FIG. 6 is an exploded diagram of a circuit housing and a key mechanism according to some embodiments of the present disclosure.
Figure 7:
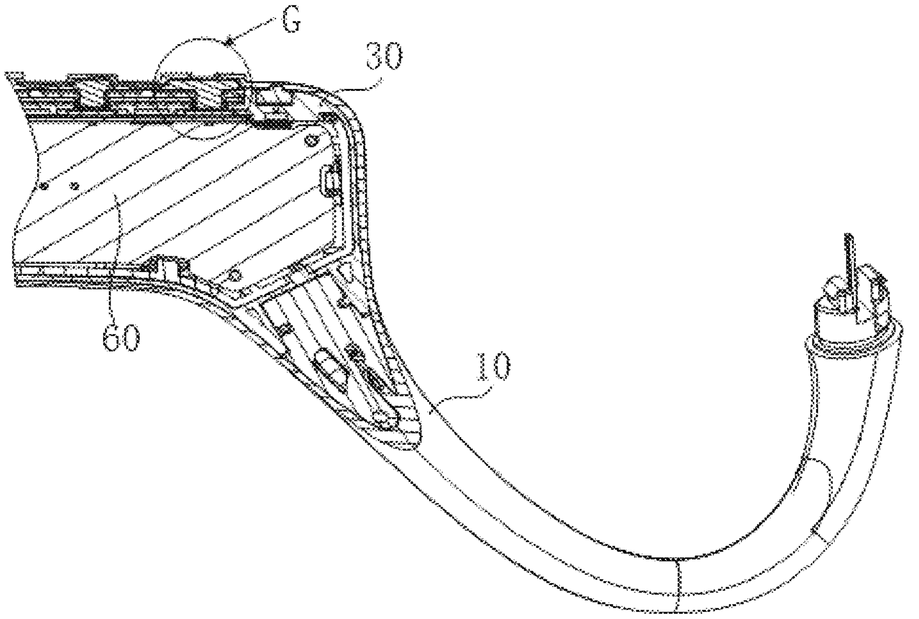
FIG. 7 is a partial sectional view of a circuit housing, a key mechanism, and an ear hook according to some embodiments of the present disclosure.
Figure 8:
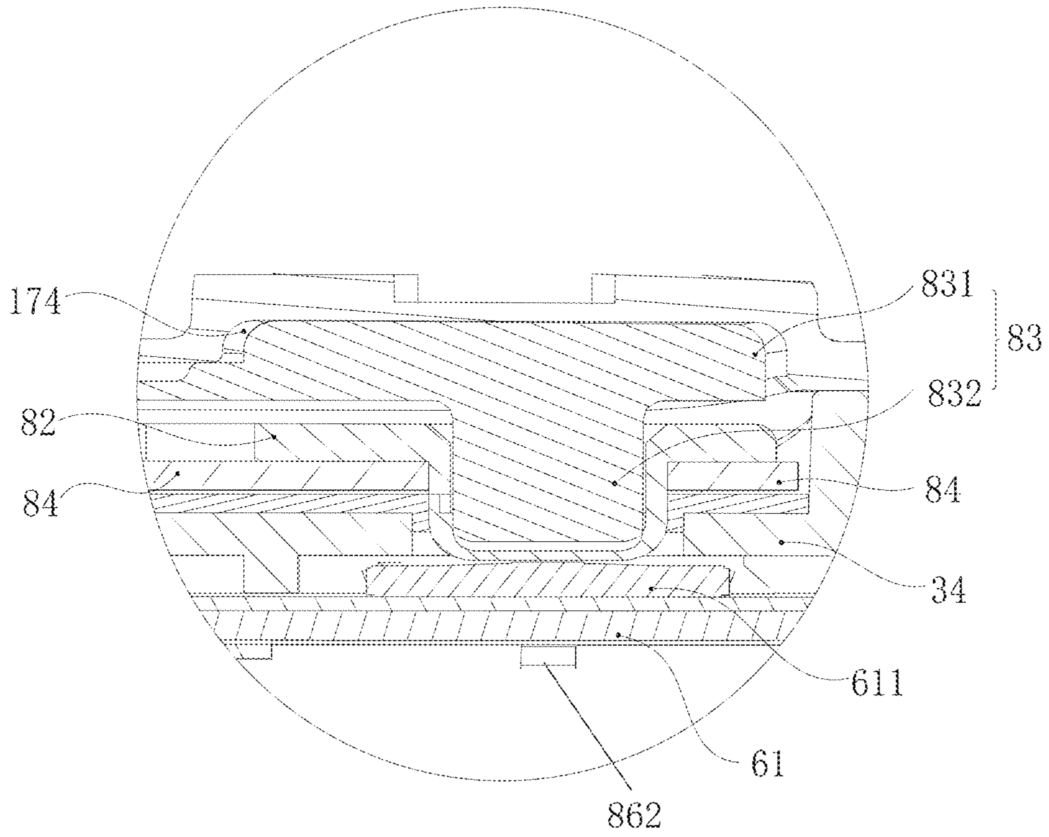
FIG. 8 is a partial enlarged view of part G in FIG. 7.

FIG. 6 is an exploded diagram of a circuit housing and a key mechanism according to some embodiments of the present disclosure. FIG. 7 is a partial sectional view of a circuit housing, a key mechanism, and an ear hook according to some embodiments of the present disclosure. FIG. 8 is a partial enlarged diagram of part G in FIG. 7. Combining FIG. 2, FIG. 6, FIG. 7, and FIG. 8, in some embodiments, an MP3 player is also provided with a key mechanism (or key 83). In the embodiment, the circuit housing 30 may be arranged in a flat shape. The two oppositely arranged sidewalls with a larger area of the circuit housing 30 are the main sidewalls 33, and the two pairs of sidewalls arranged oppositely with a smaller area that connect to the two main sidewalls 33 are auxiliary sidewalls 34. The outer surface of the auxiliary sidewalls 34 of the circuit housing 30 is arranged with a first recessed region 341, the first recessed region 341 is further arranged with a keyhole 342 which communicates with the outer surface and the inner surface of the auxiliary sidewalls 34. The auxiliary sidewalls 34 of the circuit housing 30 may include the auxiliary sidewalls 34 facing the backside of a user's head when the user wears the MP3 player, and may also include the auxiliary sidewalls 34 facing the lower side of the user's head when the user wears the MP3 player. The number of the first recessed regions 341 may be one or more, and each first recessed region 341 may be arranged with one or more keyholes 342, which may be specifically set according to actual needs, and there is no specific limitation here.

In some embodiments, the MP3 player may also include an elastic pad 82. The elastic pad 82 is arranged in the first recessed region 341. Specifically, the elastic pad 82 is fixed on the outer surface of the corresponding auxiliary sidewalls 34 to cover the outside of the keyhole 342 to prevent external liquid from entering the inside of the circuit housing through the keyhole 342, thereby playing a role of sealing and waterproofing. In some embodiments, the elastic pad 82 may be provided with a second recessed region 821 corresponding to the keyhole 342. The second recessed region 821 extends to the inside of the keyhole 342. In some embodiments, the elastic pad 82 may be made of soft materials, such as soft silicone, rubber, or the like. The elastic pad 82 is relatively thin, and it is difficult to bond firmly when directly bonding to the outer surface of the auxiliary sidewalls 34.

In some embodiments, a rigid pad 84 may be further arranged between the elastic pad 82 and the circuit housing 30. The rigid pad 84 and the elastic pad 82 are fixed against each other. Specifically, it can be fixed by lamination, bonding, injection molding, or the like. Further, the rigid pad 84 and the auxiliary sidewalls 34 are bonded with each other. Specifically, it can be bonded by a double-sided tape to form an adhesive layer between the rigid pad 84 and the auxiliary sidewalls 34, so that the elastic pad 82 may be firmly fixed on the outer surface of the auxiliary sidewalls 34. Moreover, since the elastic pad 82 is soft and thin, it is difficult to maintain a flat state when the user presses the key. However, the elastic pad 82 may be kept flat by abutting and fixing with the rigid pad 84.

In some embodiments, the rigid pad 84 may also be arranged with a passing hole 841 that allows the second recessed region 821 to pass through so that the second recessed region 821 of the elastic pad 82 may further extend through the passing hole 841 to the inside of the keyhole 342. In some embodiments, the rigid pad 84 may be made of stainless steel, or other rigid materials, such as plastic and other hard materials, and may be integrally formed to abut the elastic pad 82 together.

In some embodiments, the key 83 includes a key body 831 and a key contact 832 protrudingly arranged on one side of the key body 831. The key body 831 is disposed on a side of the elastic pad 82 away from the circuit housing 30, and the key contact 832 extends into the second recessed region 821 to extend to the inside of the keyhole 342 along with the second recessed region 821. Since the MP3 player in this embodiment is relatively thin and light and the pressing stroke of the key 83 is relatively short, if a soft key is used, it may reduce the user's pressing feeling and bring a bad experience. In the embodiment, the key 83 may be made of hard plastic material, so that the user may have a good hand feeling when pressing the key.

In some embodiments, a control circuit 60 includes a key circuit board 61. The key circuit board 61 is arranged inside the circuit housing 30, and a key switch 611 corresponding to the keyhole 342 is arranged thereon. Therefore, when the user presses the key, the key contact 832 contacts and triggers the key switch 611 to further realize the corresponding function.

In the embodiment, by providing the second recessed region 821 on the elastic pad 82, on the one hand, the second recessed region 821 may cover the entire keyhole 342, so as to simultaneously improve the waterproof effect. On the other hand, in a natural state, the key contact 832 may extend to the inside of the keyhole 342 through the second recessed region 821, so as to shorten the pressing stroke of key and reduce the space occupied by the key structure, thereby making the MP3 player not only has good waterproof performance but also take up less space.

In some embodiments, the key 83 may include a key unit 833, and the number of the key unit 833 may be one or more. In an application scenario, the key 83 may include at least two key units 833 spaced apart from each other, and a connection component 834 for connecting the key units 833. The at least two key units 833 and the connection component 834 may be integrally formed. Correspondingly, each key unit 833 is corresponding arranged with one key contact 832, one keyhole 342 and one key switch 611. Each first recessed region 341 may be arranged with a plurality of key units 833, and the user may trigger different key switches 611 by pressing different key units 833, so as to realize a plurality of functions.

In some embodiments, the elastic pad 82 may be arranged with an elastic bump 822 for supporting the connection component 834. Since the key 83 includes a plurality of connectedly arranged key units 833, the arrangement of the elastic bump 822 enables the user to press one of the key units 833 individually while pressing the one key unit 833, thus avoiding the situation that the other key units 833 are pressed together result from linkage, so as to accurately trigger the corresponding key switch 611. It should be pointed out that the elastic bump 822 is not necessary, for example, it may be a protrusion structure without elasticity, or it may not be arranged with a protrusion structure, which may be set according to actual conditions. In some embodiments, the inner wall of the housing sheath 17 is arranged with a groove 174 corresponding to the key, so that it may be wrapped around the periphery of the circuit housing 30 and the key in an integrated manner.

Figure 9:
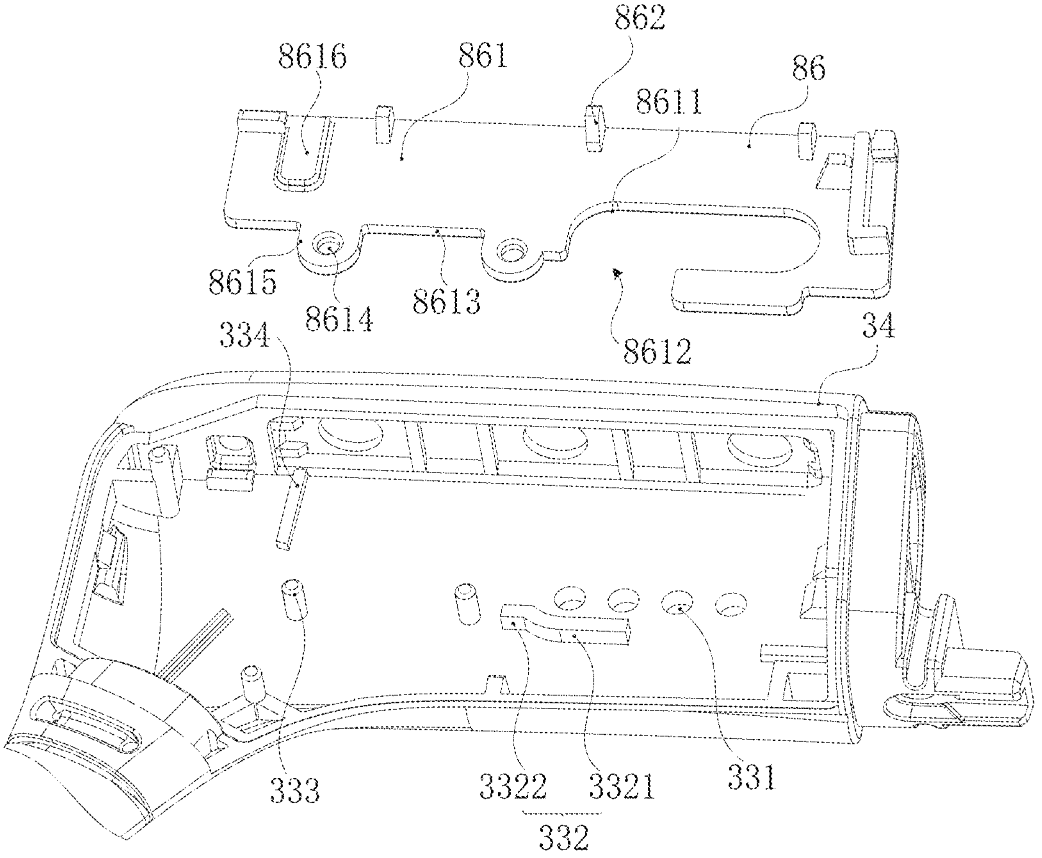
FIG. 9 is an exploded diagram of a partial structure of a circuit housing and an auxiliary sheet according to some embodiments of the present disclosure.
Figure 10:
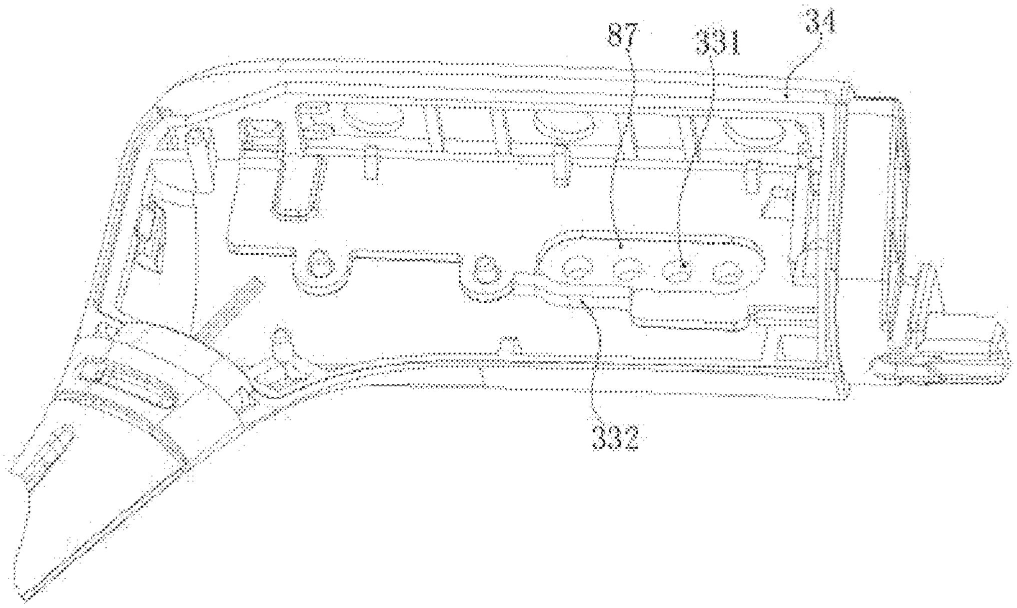
FIG. 10 is a partial structure diagram of a part of a circuit housing and an auxiliary sheet according to some embodiments of the present disclosure.

FIG. 9 is an exploded diagram of a partial structure of a circuit housing and an auxiliary sheet according to some embodiments of the present disclosure. FIG. 10 is a partial structure diagram of a part of a circuit housing and an auxiliary sheet according to some embodiments of the present disclosure. Combing with FIG. 2, FIG. 9, and FIG. 10, in some embodiments, the MP3 player may further include an auxiliary sheet 86 located inside the circuit housing 30. The auxiliary sheet 86 includes a board 861 with a hollow region 8611 and a pressing foot 862 protruding from the board 861. The pressing foot 862 may be used to press the key circuit board 61 on the inner surface of the auxiliary sidewalls 34. The board 861 may be set on the inner surface of the main sidewalls 33 by hot melting, hot pressing, bonding, or the like. Thus, a mounting hole 331 on the main sidewalls 33 is located inside the hollow region 8611. Specifically, the board surface of the board 861 may be parallel to the inner surface of the main sidewalls 33. The auxiliary sheet 86 has a certain thickness. After the auxiliary sheet 86 is arranged on the inner surface of the main sidewalls 33, it forms a glue groove 87 on the periphery of the conductive pin 85 inserted in the mounting hole 331 together with the inner sidewalls of the hollow region 8611 of the auxiliary sheet 86 and the main sidewalls 33.

In some embodiments, a sealant may be used in the glue groove 87 to seal the mounting hole 331 from the inside of the circuit housing 30 to improve the airtightness of the circuit housing 30, thereby improving the waterproof performance of the bone conduction MP3 player.

In some embodiments, the material of the auxiliary sheet 86 may be the same as the material of the circuit housing 30 and be molded separately from the circuit housing 30. It should be pointed out that during the molding stage of the circuit housing 30, there are often other structures near the mounting hole 331, such as keyholes 342 that need to be molded. The corresponding molds for these structures may need to exit out from the inside of the circuit housing 30 during molding. At this time, if the glue groove 87 corresponding to the mounting hole 331 is directly formed integrally inside the circuit housing 30, the protrusion of the glue groove 87 may interfere with the smooth exit of the molds of these structures, thereby causing inconvenience to production. In the embodiment, the auxiliary sheet 86 and the circuit housing 30 are independent structures. After the two independent structures are formed separately, the glue groove 87 may be formed together with the main sidewalls 33 of the circuit housing 30 by installing the auxiliary sheet 86 inside the circuit housing 30. Thus, during the molding stage of the circuit housing 30, the mold may not be blocked from exiting from the circuit housing 30, so as to facilitate production smoothly.

In some embodiments, when the circuit housing 30 is molded, the exiting of mold only occupies a part of the space occupied by the glue groove 87. It may integrally form a part of the glue groove 87 on the inner surface of the main sidewalls 33 without affecting the exiting of mold, and the other part of the glue groove 87 may still be formed by the auxiliary sheet 86.

In some embodiments, a first strip-shaped rib 332 is integrally formed on the inner surface of the main sidewalls 33. The position of the first strip-shaped rib 332 does not affect the exiting of mold of the circuit housing 30. The hollow region 8611 of the auxiliary sheet 86 is arranged with a gap 8612. The first strip-shaped rib 332 corresponds to the gap 8612. After the circuit housing 30 and the auxiliary sheet 86 are separately formed, the auxiliary sheet 86 may be arranged on the inner surface of the main sidewalls 33, thus the first strip-shaped rib 332 is at least partially fitted into the gap 8612. The first strip-shaped rib 332 and the auxiliary sheet 86 cooperatively make the glue groove 87 to close.

In the embodiment, since the first strip-shaped ribs 332 does not block the exiting of mold, the sidewalls of the glue groove 87 may be formed by the first strip-shaped rib 332 integrally formed on the inner surface of the main sidewalls 33 together with the auxiliary sheet 86.

In some embodiments, the first strip-shaped rib 332 further extends to abut against the side edge 8613 of the board 861 to locate the board 861. The first strip-shaped rib 332 includes a ribbed body 3321 and a positioning arm 3322. The ribbed body 3321 is used to match and fit the gap 8612 of the hollow region 8611 to form the sidewalls of the glue groove 87. The positioning arm 3322 is generated by the further extension of one end of the ribbed body 3321 which extends to the side edge 8613 of the board 861 to abut the side edge 8613, thereby positioning the board 861 at the side edge 8613.

In some embodiments, the protruding height of the first strip-shaped rib 332 on the inner surface of the main sidewalls 33 may be greater than the thickness of the auxiliary sheet 86 or may be less than or equal to the thickness of the auxiliary sheet 86, as long as it may form the glue groove 87 together with the auxiliary sheet 86 and may be able to position the board 861 of the auxiliary sheet 86, which is not specifically limited here.

In some embodiments, the board 861 may be arranged with a positioning hole 8614, and the positioning hole 8614 is arranged through the mainboard surface of the board 861. A positioning pin 333 corresponding to the positioning holes 8614 is integrally formed on the inner surface of the main sidewalls 33. After the auxiliary sheet 86 is arranged on the inner surface of the main sidewalls 33, the positioning pin 333 is inserted into the positioning holes 8614, so as to further position the auxiliary sheet. The number of positioning holes 8614 and the number of positioning pins 333 are the same (e.g., both the numbers are two in the present embodiment).

In an application scenario, the side edge 8613 of the board 861 is formed with at least two lugs 8615, and the two positioning holes 8614 may be arranged on the corresponding lugs 8615 respectively. A second strip-shaped rib 334 is integrally formed on the inner surface of the main sidewalls 33. The second strip-shaped rib 334 may extend in a direction toward the auxiliary sidewall 34 and may be perpendicular to the extension direction of the positioning arm 3322 of the first strip-shaped rib 332. The board 861 is also arranged with a strip-shaped positioning groove 8616 corresponding to the second strip-shaped rib 334. The positioning groove 8616 is recessed in a direction away from the main sidewall 33, and one end of the positioning groove 8616 is connected to the side edge 8613 of the board 861 and may be set perpendicular to the side edge 8613.

In an application scenario, the positioning groove 8616 may be formed only by the recessed surface of the board 861 that fits the main sidewalls 33, and the depth of the positioning groove 8616 is less than the thickness of the board 861. In such a case, the surface of the board 861 opposite to the recessed surface is not affected by the positioning groove 8616. In another application scenario, the depth of the positioning groove 8616 is greater than the depth of the board 861, thus when the surface of the board 861 near the surface of the main sidewalls 33 is recessed, the other opposite surface protrudes toward the recessed direction to form the positioning slot 8616 cooperatively. After the auxiliary sheet 86 is arranged on the inner surface of the main sidewalls 33, the second strip-shaped rib 334 is embedded in the strip-shaped positioning groove 8616 to further position the board 861.

Combining FIG. 2, FIG. 5, and FIG. 6, in some embodiments, the housing sheath 17 is arranged with an exposed hole 175 corresponding to the conductive pin 85. After arranging the housing sheath 17 on the periphery of the circuit housing 30, the end of the conductive pin 85 located outside the circuit housing 30 is further exposed through the exposed hole 175 and then connected to the circuit outside the MP3 player, thus the MP3 player performs power supply or data transmission by the conductive pin.

In some embodiments, the outer surface of the circuit housing 30 is recessed with the glue groove 39 surrounding a plurality of mounting holes 331. Specifically, the glue groove 39 may have an elliptical ring shape, and the plurality of mounting holes 331 are arranged on the circuit housing 30 surrounded by the elliptical ring glue groove 39. A sealant is applied in the glue groove 39. After the housing sheath 17 and the circuit housing 30 are assembled, the housing sheath 17 may be connectedly sealed to the circuit housing 30 at the periphery of the mounting hole 331 by the sealant, thus avoiding the housing sheath 17 slides on the periphery of the circuit housing 30 when external liquid entering the housing sheath 17 through the exposed hole 175, which may further seal the mounting hole 331 from the outside of the circuit housing 30 and further improve the airtightness of the circuit housing 30, thereby further improving the waterproof performance of the MP3 player.

It should be noted that the above illustration of the MP3 player is only a specific example and should not be regarded as the only feasible implementation solution. Obviously, for those skilled in the art, after understanding the basic principles of the MP3 player, they may conduct various amendments and changes in forms and details for specific methods and operations of implementing MP3 players, but these amendments and changes are still within the scope of the present disclosure. For example, the number of the first recessed regions 341 may be multiple, and each first recessed region may also be arranged with one or more keyholes correspondingly, which is not limited here. Such deformations are all within the protection scope of the present disclosure.

In some embodiments, the key mechanism in the embodiments described above may include a power switch key, function shortcut keys, and a menu shortcut key according to functions. In some embodiments, the function shortcut keys may include a volume up key and a volume down key for adjusting the level of the sound, a fast forward key and fast backward key for adjusting the progress of the sound file, and a key for controlling the connection between the MP3 player and an external device (for example, Bluetooth connection). In some embodiments, the key mechanism may include two forms of physical keys and virtual keys. For example, when the key mechanism exists in the form of a physical key, the key may be arranged at each sidewall of the circuit housing that is not in contact with the human body. For the specific structure and arrangement of the key, please refer to the specific content of the key mechanism described above. When a user wears the MP3 player in the embodiment, the keys may be exposed on the outside to be convenient for users to wear and operate each key. In some embodiments, the surface of an end of each key in the key mechanism may be arranged with an identification corresponding to its function. In some embodiments, the identification may include text (e.g., in Chinese, English), symbols (e.g., the volume plus key is marked with "+", the volume minus key is marked with "−"), etc. In some embodiments, the identification may be disposed on the key through laser printing, screen printing, pad printing, laser filler, thermal sublimation, hollow-out text, or the like. In some embodiments, the identification of the key may also be arranged on the surface of the circuit housing located on the surrounding side of the key, which may also be as a label. In some embodiments, the MP3 player may use a touch screen, and the control program installed in the MP3 player may generate virtual keys on the touch screen with interactive functions. The virtual keys may select the functions, volume, and files of the player. In addition, the MP3 player may also be a combination of a physical display and physical keys.

In some embodiments, the MP3 player may be arranged with at least one key mechanism. The key mechanism may be used for human-computer interaction, for example, realizing operations such as pause/start, recording, answering calls, or the like. It should be understood that the key mechanism shown in FIG. 6 is only for illustrative purposes. Those skilled in the art may adjust parameters such as the position, quantity, and shape of the key mechanism on the basis of fully understanding the function of the key module. For example, the key mechanism may also be arranged at other positions of the circuit housing or the loudspeaker device.

In some embodiments, the keys in the key mechanism may implement different interactive functions based on the user's operation instructions. For example, clicking the key once may realize the pausing/starting (such as music, recording, etc.) function, clicking the key twice quickly may realize the answering the call function, clicking regularly (for example, once every second and click twice in total) may realize the recording function. In some embodiments, the user's operation instructions may be operations such as clicking, sliding, scrolling, or the like, or a combination of operations. For example, sliding up and down on the surface of the key may realize the function of increasing/lowering volume.

In other embodiments, there may be at least two key mechanisms each of which corresponds to one of the two core housings on the left and right sides, respectively. The user may use the left and right hands to operate the key mechanism respectively to improve the user experience.

In an application scenario, in order to further improve the user's human-computer interaction experience, the functions of human-computer interaction may be assigned to the key mechanisms on the left and right sides. The user may operate the keys in the corresponding key mechanism according to different functions. For example, the recording function may be turned on by clicking once the corresponding key on the left, while the recording function may be turned off by clicking again the corresponding key, and the pause/play function may be realized by clicking twice quickly. The function of answering the call may be realized by clicking twice quickly on the key on the right side. When the key on the right side is clicked twice quickly, and a song is playing and there is no phone call access at this time, the next/previous music switching function may be realized.

In some embodiments, the functions corresponding to the keys in the left and right key mechanisms described above may be user-defined. For example, the user may assign the pause/play function performed by the key on the left side to the key on the right side by an application software, or assign the answering call function performed by the key on the right side to the key on the left side. In addition, the user may also set the operation instructions (such as the number of clicks, sliding gestures) implementing the corresponding functions by the application software. For example, the operation instruction corresponding to the answering call function is set from one click to two clicks, and the operation instruction corresponding to the switching to the next/previous music function is set from two clicks to three clicks. User customization may be more in line with user-operating habits, which avoids operating errors to a certain extent and improves user experience.

In some embodiments, the human-computer interaction function described above may not be unique but is set according to the functions commonly used by the user. For example, the keys in the key mechanism may also implement functions such as rejecting calls and reading text messages by voice, or the like. Users may customize the functions and the corresponding operation instructions to meet different needs.

In some embodiments, the MP3 player may be connected to an external device by at least one key. For example, the MP3 player may be connected to a mobile phone via a key in the key mechanism for controlling wireless connection (for example, a key for controlling Bluetooth connection). Optionally, after the connection is established, the user may directly operate the MP3 player on the external device (for example, a mobile phone) to implement one or more of the functions described above.

It should be noted that the above illustrations of the MP3 player are only specific examples and should not be regarded as the only feasible implementation solution. Obviously, for those skilled in the art, after understanding the basic principles of the MP3 players, they may conduct various amendments and changes in forms and details to the specific methods and operations of implementing the MP3 players without departing from the principle, but the amendments and changes are still within the scope of the present disclosure. For example, the shape of the key may be a regular shape or an irregular shape such as a rectangle, a circle, an ellipse, a triangle, or the like. As another example, the shape of each key may be the same or different. Such deformations are within the protection scope of the present disclosure.

In some embodiments, the MP3 player may include an indicator light (not shown in the figure) to display the state of the MP3 player. Specifically, the indicator light may send out a light signal, and the state of the MP3 player may be known by observing the light signal. In some embodiments, the indicator light may illustrate the power status of the MP3 player. For illustration purposes, for example, when the indicator light is red, it may indicate that the MP3 player has insufficient power (for example, the MP3 player has less than 10% power). As another example, when the MP3 player is charged, the indicator light is yellow, and when the MP3 player is fully charged, the indicator light is green. In some alternative embodiments, for example, when the MP3 player is in a state of communicating with an external device, the indicator light may keep blinking or may be illustrated in other colors (for example, blue). In some alternative embodiments, the indicator light may illustrate the status of data transmission between the MP3 player and the external device. For example, when a user uses a mobile terminal to transmit data to the MP3 player, the indicator light may switch colors based on a specific frequency. As another example, the indicator light may illustrate a fault state of the MP3 player. When the MP3 player is in the fault state, the indicator light is red and keeps blinking. In some embodiments, the indicator light may further include one indicator light or a plurality of indicator lights. In some embodiments, when there is a plurality of indicator lights, the colors of the indicator lights may be the same or different.

It should be noted that the above descriptions of the MP3 player are only specific examples and should not be regarded as the only feasible implementation solution. Obviously, for those skilled in the art, after understanding the basic principles of the MP3 players, they may conduct various amendments and changes in forms and details on the specific methods and operations of implementing the MP3 players without departing from the principle, but these amendments and changes are still within the scope described above. For example, the number of indicator lights is not limited to one, and more than one may be selected according to actual needs. As another example, the status of the MP3 player is not limited to the illustrations of the indicator light described above. For example, when the MP3 player is in a charging state, the indicator light may illustrate other colors or keep blinking. Such deformations are all within the protection scope of the present disclosure.

Figure 11:
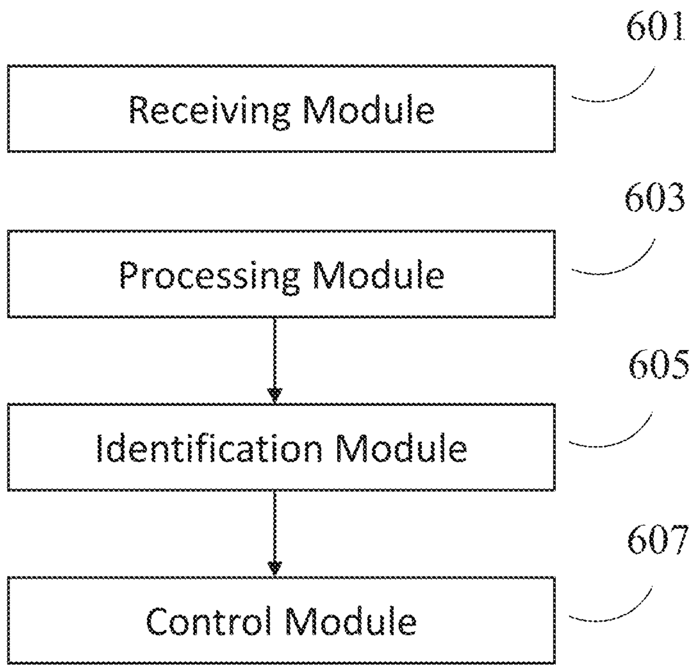
FIG. 11 is a block diagram of a voice control system according to some embodiments of the present disclosure.

FIG. 11 is a block diagram of a voice control system according to some embodiments of the present disclosure. The voice control system may be used as a part of the auxiliary key mechanism or may be integrated into the loudspeaker apparatus as a separate module. As shown in FIG. 11, in some embodiments, the voice control system includes a receiving module 601, a processing module 603, an identification module 605, and a control module 607.

In some embodiments, the receiving module 601 may be configured to receive a voice control instruction and send the voice control instruction to the processing module 603. In some embodiments, the receiving module 601 may include one or more microphones. In some embodiments, when the receiving module 601 receives the voice control instruction inputted by a user, (e.g., the receiving module 601 receives a voice control instruction of “start playing”), the receiving module 601 may then send the voice control instruction to the processing module 603.

In some embodiments, the processing module 603 may be in communication with the receiving module 601. The processing module 603 may generate an instruction signal according to the voice control instruction, and send the instruction signal to the identification module 605.

In some embodiments, when the processing module 603 receives the voice control instruction inputted by the user from the receiving module 601 through the communication connection, the processing module 603 may generate an instruction signal according to the voice control instruction.

In some embodiments, the identification module 605 may be in communication with the processing module 603 and the control module 607. The identification module 605 may identify whether the instruction signal matches a predetermined signal, and send a matching result to the control module 607.

In some embodiments, when the identification module 605 determines that the instruction signal matches the predetermined signal, the identification module 605 may send the matching result to the control module 607. The control module 607 may control the operations of the loudspeaker apparatus according to the instruction signal. For example, when the receiving module 601 receives a voice control instruction of “start playing”, and when the identification module 605 determines that the instruction signal corresponding to the voice control instruction matches the predetermined signal, the control module 607 may automatically perform the voice control instruction. The control module 607 may immediately automatically perform starting playing audio data. When the instruction signal does not match the predetermined signal, the control module 607 may not perform the control instruction.

In some embodiments, the voice control system may further include a storage module, which is in communication with the receiving module 601, the processing module 603, and the identification module 605. The receiving module 601 may receive and send a predetermined voice control instruction to the processing module 603. The processing module 603 may generate a predetermined signal according to the predetermined voice control instruction, and send the predetermined signal to the storage module. When the identification module 605 needs to match the instruction signal received from the processing module 603 with the predetermined signal, the storage module may send the predetermined signal to the identification module 605 through the communication connection.

In some embodiments, the processing module 603 may further include removing environmental sound contained in the voice control instruction.

In some embodiments, the processing module 603 in the voice control system may further include performing denoising processing on the voice control instruction. The denoising processing may refer to removing the environmental sound contained in the voice control instruction. In some embodiments, when in a complex environment, the receiving module 601 may receive and send the voice control instruction to the processing module 603. Before the processing module 603 generates the corresponding instruction signal according to the voice control instruction, in order to prevent the environmental sound from interfering with the recognition process of the identification module 605, the voice control instruction may first be denoised. For example, when the receiving module 601 receives a voice control instruction inputted by the user when the user is in an outdoor environment, the voice control instruction may include environmental sound such as vehicle driving on the road, whistle. The processing module 602 may perform the denoising processing to reduce the influence of the environmental sound on the voice control instruction.

It should be noted that the above description of the voice control system is only a specific example and should not be considered as the only feasible implementation solution. Obviously, for persons having ordinary skills in the art, after understanding the basic principle of the voice control system, various modifications and changes may be made in the form and details of the specific ways and steps of implementing the voice control system without departing from the principle, but these modifications and changes are still within the scope of the present disclosure. For example, the receiving module and the processing module may be independent modules or a same module. Such deformations are all within the protection scope of the present disclosure.

Under normal circumstances, the sound quality of the MP3 player is affected by various factors, such as the physical properties of the components of the loudspeaker apparatus, the vibration transmission relationship among the components, the vibration transmission relationship between the loudspeaker and the outside world, and the efficiency of the vibration delivery system in transmitting vibration, or the like. The components of the loudspeaker may include components that generate vibrations (such as but not limited to earphone cores), components that fix the loudspeaker (such as but not limited to ear hooks), and components that transmit vibrations (such as but not limited to panels on the core housing, vibration transmission layer, etc.). The vibration transmission relationship among the components and the vibration transmission relationship between the loudspeaker and the outside world are determined by the contact mode between the loudspeaker and the user (such as but not limited to clamping force, contact area, contact shape, etc.).

Figure 12:
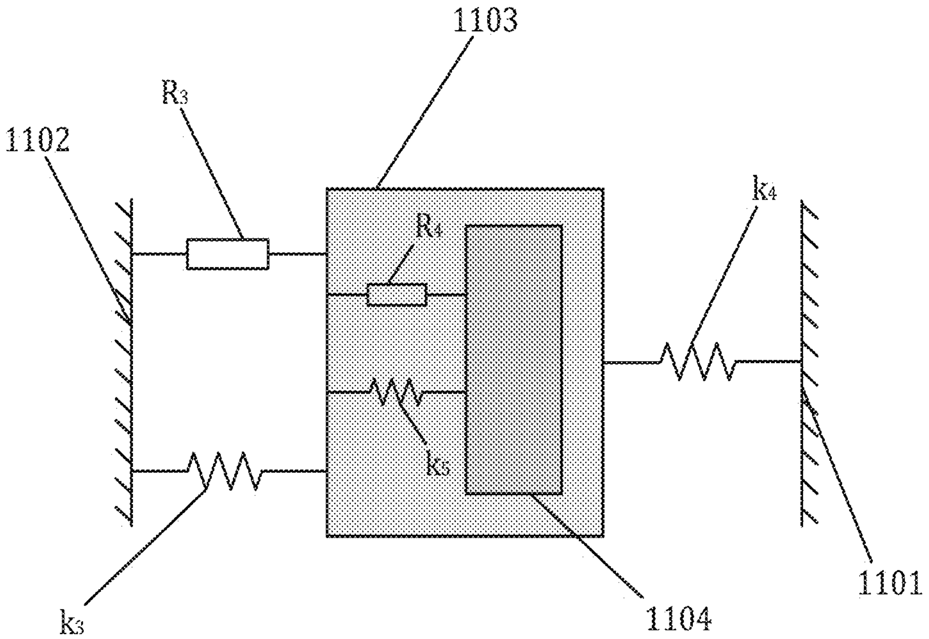
FIG. 12 is an equivalent model of a vibration generation and delivery system of an MP3 player according to some embodiments of the present disclosure.

For illustration purposes, the following description may further illustrate the relationship between sound quality and each component of the loudspeaker based on a bone conductive MP3 player. It should be understood that without breaking the principle, the content illustrated below may also be applied to the air conductive loudspeaker apparatus. FIG. 12 is an equivalent model of a vibration generation and delivery system of an MP3 player according to some embodiments of the present disclosure. As shown in FIG. 12, the vibration generation and delivery system includes a fixed end 1101, a sensing terminal 1102, a vibration unit 1103, and an earphone core 1104. The fixed end 1101 is connected to the vibration unit 1103 through the transfer relationship K1 ($k_4$ in FIG. 12). The sensing terminal 1102 is connected to the vibration unit 1103 through the transfer relationship K2 ($k_3$ in FIG. 12). The vibration unit 1103 is connected to the earphone core 1104 through the transfer relationship K3 ($k_4$ and $k_5$ In FIG. 12).

The vibration unit mentioned herein is the core housing, and the transfer relations K1, K2, and K3 are the illustrations of the functional relations among the corresponding components in the MP3 player equivalent system (more detailed descriptions may be illustrated below). The vibration equation of the equivalent system may be expressed as:

$$m_3x_3''+R_3x_3'-R_4x_4'+(k_3+k_4)x_3+k_5(x_3-x_4)=f_3 \tag{1}$$

$$m_3x_3''+R_3x_3'-R_4x_4'+(k_3+k_4)x_3+k_5(x_3-x_4)=f_3 \tag{2}$$

wherein $m_3$ is the equivalent mass of the vibration unit 1103; $m_4$ is the equivalent mass of the earphone core 1104; $x_3$ is the equivalent displacement of the vibration unit 1103; $x_4$ is the equivalent displacement of the earphone core 1104; $k_3$ is the equivalent elastic coefficient between the sensing terminal 1102 and the vibration unit 1103; $k_4$ is the equivalent elastic coefficient between the fixed end 1101 and the vibration unit 1103; $k_5$ is the equivalent elastic coefficient between the earphone core 1104 and the vibration unit 1103; $R_3$ is the equivalent damping between the sensing terminal 1102 and the vibration unit 1103; $R_4$ is the equivalent damping between the earphone core 1104 and the vibration unit 1103; and $f_3$ and $f_4$ are the interaction forces between the vibration unit 1103 and the earphone core 1104, respectively. The equivalent amplitude $A_3$ of the vibration unit 1103 in the system is denoted as:

$$A_3 = -\frac{(m_4\omega^2)}{(m_3\omega^2 + j\omega R_3 - (k_3 + k_4 + k_5))(m_4\omega^2 + j\omega R_4 - k_5) - k_5(k_5 - j\omega R_4)} \cdot f_0 \tag{3}$$

wherein $f_0$ denotes a unit driving force; and w denotes the vibration frequency. Therefore, the factors that affect the frequency response of the bone conductive MP3 player may include the vibration generation portions (e.g., the vibration unit, the earphone core, the housing, and the interconnection ways thereof, such as $m_3$, $m_4$, $k_5$, $R_4$, etc., in the Equation (3)), and vibration transmission portions (e.g., the way of contacting the skin, the property of the ear hook, such as $k_3$, $k_4$, $R_3$, etc., in the Equation (3)). The frequency response and the sound quality of the bone conductive MP3 player may be changed by changing the structure of the various components of the bone conductive MP3 player and the parameters of the connections between the various components. For example, changing the magnitude of the clamping force is equivalent to changing the $k_4$, changing the bonding way of glue is equivalent to changing the $R_4$ and $k_5$, and changing the hardness, elasticity, and damping of the materials is equivalent to changing the $k_3$ and $R_3$.

In a specific embodiment, the fixed end 1101 may be a relatively fixed point or a relatively fixed area of the bone conductive MP3 player during the vibration process. The point or area may be regarded as the fixed end of the bone conductive MP3 player during the vibration process. The fixed end may be composed of specific components, or may be a position determined according to the overall structure of the bone conductive MP3 player. For example, the bone conductive MP3 player may be hung, glued, or adsorbed near the human ear by a specific device, and the structure and shape of the bone conductive MP3 player may also be designed to make the bone conductive component stick to the human skin.

The sensing terminal 1102 is an auditory system for the human body to receive sound signals. The vibration unit 1103 is a part of the bone conductive MP3 player used to protect, support, and connect the earphone core. The vibration unit 1103 includes a part directly or indirectly touched by the user, such as a vibration transmission layer or panel that transmits vibration to the user, as well as the housing that protects and supports other vibration generating components, or the like. The earphone core 1104 is a component for generating sound vibration, which may be one or more combinations of the transducers discussed above.

The transmission relationship K1 may connect the fixed end 1101 and the vibration unit 1103, which indicates the vibration transmission relationship between the vibration generation components of the bone conductive MP3 player and the fixed end. K1 may be determined based on the shape and structure of the bone conductive MP3 player. For example, the bone conductive MP3 player may be fixed to the head of the human in the form of a U-shaped earphone rack/earphone strap, and may also be installed on devices such as a helmet, a fire mask, or other special-purpose masks, glasses, etc. The different shapes and structures of the bone conductive MP3 player can affect the vibration transmission relationship K1. Further, the structure of the loudspeaker may also include physical properties such as the material and quantity of different components of the bone conductive MP3 player. The transmission relationship K2 may connect the sensing terminal 402 and the vibration unit 1103.

K2 may be determined based on the composition of the delivery system. The delivery system may include transmitting sound vibration to the auditory system through the user's tissue (also referred to as human tissue). For example, when the sound is transmitted to the auditory system through the skin, the subcutaneous tissue, bones, etc., the physical properties of different human tissues and their interconnections may affect K2. Further, the vibration unit 1103 may be in contact with the human tissue. In different embodiments, the contact area on the vibration unit may be a side of the vibration transmission layer or the panel. The surface shape, size of the contact area, and the interaction force of the contact area with the human tissue may affect the transmission relationship K2.

The transmission relationship K3 between the vibration unit 1103 and the earphone core 1104 may be determined by internal connection properties of the vibration generation components of the bone conductive MP3 player. The connection mode (e.g., rigid or elastic connection mode) of the earphone core and the vibration unit, or the relative position of the connector between the earphone core and the vibration unit may change the transmission efficiency of the earphone core to transmit vibration to the vibration unit, especially the transmission efficiency of the panel, which affects the transmission relationship K3.

During the use of the bone conductive MP3 player, the generation and transmission process of the sound can affect the sound quality felt by the human (or the user). For example, the fixed end, the sensing terminal, the vibration unit, the transducer, and the transmission relationships K1, K2, and K3, etc., may affect the sound quality of the bone conductive MP3 player. It should be noted that K1, K2, and K3 are only a representation of the connection ways of different components or systems during the vibration transmission process, which may include but not limited to physical connection ways, force transmission ways, sound transmission efficiency, etc.

The above illustration of the equivalent system of the bone conductive MP3 player is only a specific example and should not be regarded as the only feasible implementation. Obviously, for those skilled in the art, after understanding the basic principles of the bone conductive MP3 player, various amendments and changes in forms and details of the specific methods and steps that affect the vibration transmission of the bone conductive MP3 player may be made without departing from this principle, but these amendments and changes are still within the scope of the above description. For example, K1, K2, and K3 described above may be a simple vibration or mechanical transmission way, or may include a complex non-linear delivery system. The transmission relationship may include transmission through direct connection of various components (or parts), or may include transmission through a non-contact way.

Figure 13:
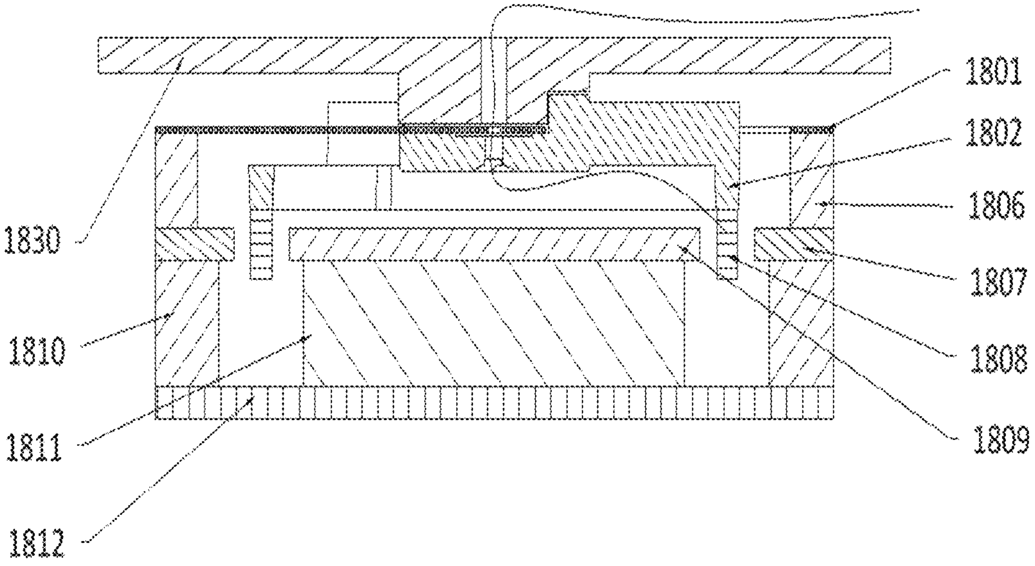
FIG. 13 is a structural diagram of a composite vibration component of an MP3 player according to some embodiments of the present disclosure.
Figure 14:
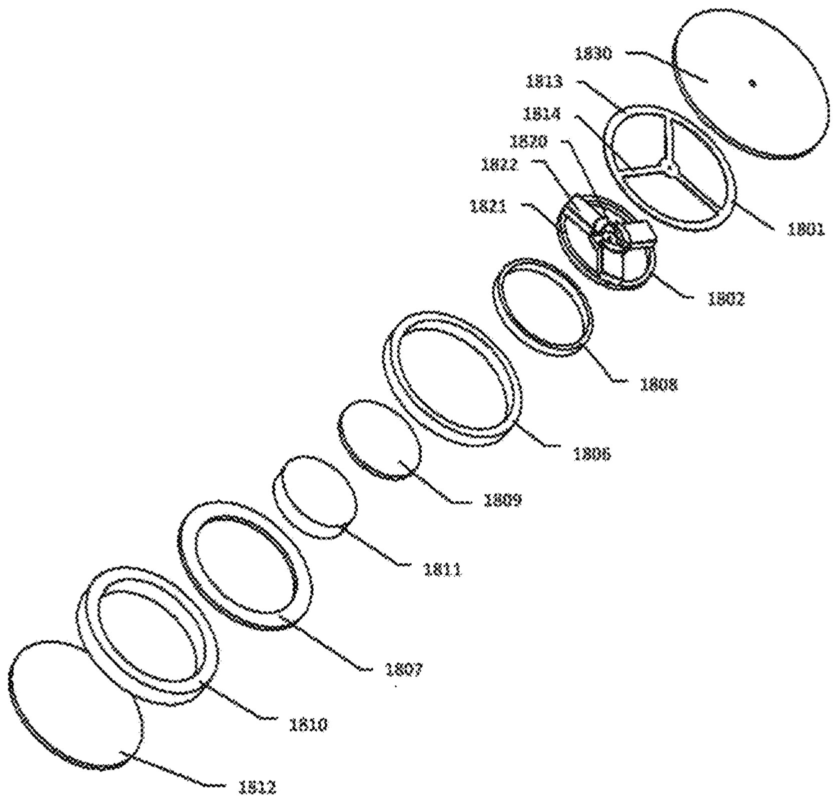
FIG. 14 is a structural diagram of an MP3 player and a composite vibration component thereof according to some embodiments of the present disclosure.

FIG. 13 is a structural diagram of a composite vibration component of an MP3 player according to some embodiments of the present disclosure. FIG. 14 is a structural diagram of an MP3 player and a composite vibration component thereof according to some embodiments of the present disclosure.

In some embodiments, the MP3 player is also provided with a composite vibration component. In some embodiments, the composite vibration component may be part of an earphone core. In some embodiments, the composite vibration component in FIG. 13 may be the vibration component that provides sound inside the core housing 20 in FIG. 2. Specifically, the composite vibration component in the embodiment of the present disclosure is equivalent to a specific embodiment of the transfer relationship K3 between the vibration unit 1103 and the earphone core 1104 in FIG. 10. Embodiments of the composite vibration component on the MP3 player are shown in FIG. 13 and FIG. 14, the composite vibration component may be composed of a vibration conductive plate 1801 and a vibration plate 1802. The vibration conductive plate 1801 may be disposed as a first annular body 1813. Three first support rods 1814 that are converged toward a center may be disposed in the first annular body 1813. The position of the converged center may be fixed to a center of the vibration plate 1802. The center of the vibration plate 1802 may be a groove 1820 that matches the converged center and the first support rods. The vibration plate 1802 may be disposed with a second annular body 1821 having a radius different from that of the vibration conductive plate 1801, and three second support rods 1822 having different thicknesses from the first support rods 1814. The first support rods 1814 and the second support rods 1822 may be staggered, and may have a 60° angle.

Figure 15:
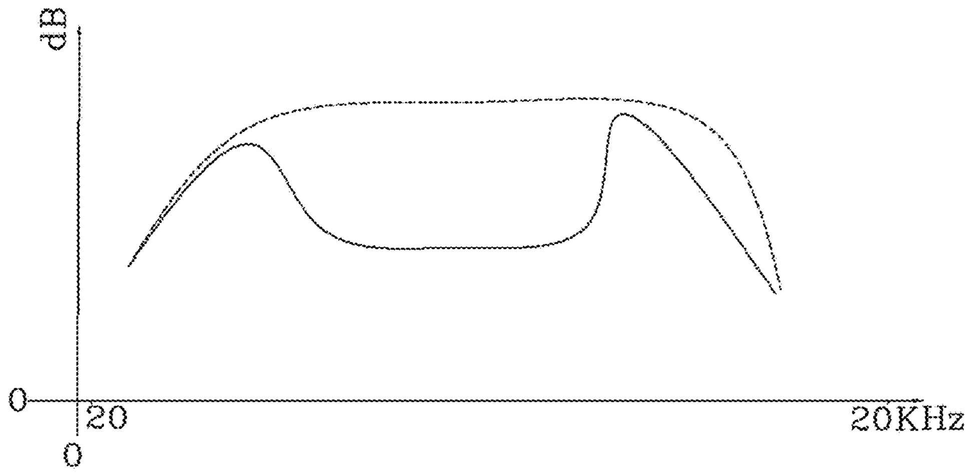
FIG. 15 is a diagram of frequency response curves of an MP3 player according to some embodiments of the present disclosure.

The first and second support rods may both be straight rods or other shapes that meet specific requirements. The count of the support rods may be more than two, and symmetrical or asymmetrical arrangement may be applied to meet the requirements of economic and practical effects. The vibration conductive plate 1801 may have a thin thickness and can increase elastic force. The vibration conductive plate 1801 may be stuck in the center of the groove 1820 of the vibration plate 1802. A voice coil 1808 may be attached to the lower side of the second annular body 1821 of the vibration plate 1802. The composite vibration component may also include a bottom plate 1812 on which an annular magnet 1810 is disposed. An inner magnet 1811 may concentrically be disposed in the annular magnet 1810. An inner magnetic plate 1809 may be disposed on the top of the inner magnet 1811, and an annular magnetic plate 1807 may be disposed on the annular magnet 1810. A washer 1806 may be fixedly disposed above the annular magnetic plate 1807. The first annular body 1813 of the vibration conductive plate 1801 may be fixedly connected to the washer 1806. The composite vibration component may be connected to outside component(s) through a panel 1830. The panel 1830 may be fixedly connected to the position of the converged center of the vibration transmission plate 1801, and may be fixed to the center of the vibration transmission plate 1801 and the vibration plate 1802. Using the composite vibration component composed of the vibration plate and the vibration conductive plate, the frequency response as shown in FIG. 15 can be obtained, and two resonance peaks may be generated. By adjusting parameters such as the size and material of the two components (e.g., the vibration conductive plate and the vibration plate) may make the resonance peaks appear in different positions. For example, a low-frequency resonance peak appears at a position at a lower frequency, and/or a high-frequency resonance peak appears at a position at a higher frequency. In some embodiments, the stiffness coefficient of the vibration plate may be greater than the stiffness coefficient of the vibration conductive plate. The vibration plate may generate the high-frequency resonance peak of the two resonance peaks, and the vibration conductive plate may generate the low-frequency resonance peak of the two resonance peaks. The resonance peaks may be or may not be within the frequency range of sound perceivable by human ears. In some embodiments, neither of the resonance peaks may be within the frequency range of sound perceivable by the human ears. In some embodiments, one resonance peak may be within the frequency range of sound perceivable by the human ears, and another resonance peak may not be within the frequency range of sound perceivable by the human ears. In some embodiments, both the resonance peaks may be within the frequency range of sound perceivable by the human ears. In some embodiments, both the resonance peaks may be within the frequency range of sound perceivable by the human ears, and their frequencies may be between 80 Hz-18000 Hz. In some embodiments, both the resonance peaks may be within the frequency range of sound perceivable by the human ears, and their frequencies may be between 200 Hz-15000 Hz. In some embodiments, both the resonance peaks may be within the frequency range of sound perceivable by the human ears, and their frequencies may be between 500 Hz-12000 Hz. In some embodiments, both the resonance peaks may be within the frequency range of sound perceivable by the human ears, and their frequencies may be between 800 Hz-11000 Hz. The frequencies of the resonance peaks may have a certain gap. For example, the frequency difference between the two resonance peaks may be at least 500 Hz. In some embodiments, the frequency difference between the two resonance peaks may be at least 1000 Hz. More In some embodiments, the frequency difference between the two resonance peaks may be at least 2000 Hz. In some embodiments, the frequency difference between the two resonance peaks may be at least 5000 Hz. In order to achieve better results, the both resonance peaks may be within the frequency range of sound perceivable by the human ears, and the frequency difference between the two resonance peaks may be at least 500 Hz. In some embodiments, the both resonance peaks may be within the frequency range of sound perceivable by the human ears, and the frequency difference between the two resonance peaks may be at least 1000 Hz. In some embodiments, the both resonance peaks may be within the frequency range of sound perceivable by the human ears, and the frequency difference between the two resonance peaks may be at least 2000 Hz. In some embodiments, the two resonance peaks may both be within the frequency range of sound perceivable by the human ears, and the frequency difference between the two resonance peaks may be at least 3000 Hz. In some embodiments, the resonance peaks may both be within the frequency range of sound perceivable by the human ears, and the frequency difference between the two resonance peaks may be at least 4000 Hz. One of the two resonance peaks may be within the frequency range of sound perceivable by the human ears and the other may not be within the frequency range of sound perceivable by the human ears, and the frequency difference between the two resonance peaks may be at least 500 Hz. In some embodiments, one resonance peak may be within the frequency range of sound perceivable by the human ears and the other may not be within the frequency range of sound perceivable by the human ears, and the frequency difference between the two resonance peaks may be at least 1000 Hz. In some embodiments, one resonance peak may be within the frequency range of sound perceivable by the human ears and the other may not be within the frequency range of sound perceivable by the human ears, and the frequency difference between the two resonance peaks may be at least 2000 Hz. In some embodiments, one resonance peak may be within the frequency range of sound perceivable by the human ears and the other may not be within the frequency range of sound perceivable by the human ears, and the frequency difference between the two resonance peaks may be at least 3000 Hz. In some embodiments, one resonance peak may be within the frequency range of sound perceivable by the human ears and the other may not be within the frequency range of sound perceivable by the human ears, and the frequency difference between the two resonance peaks may be at least 4000 Hz. The two resonance peaks may both be between 5 Hz-30000 Hz, and the frequency difference between the two resonance peaks may be at least 400 Hz. In some embodiments, the two resonance peaks may both be between 5 Hz-30000 Hz, and the frequency difference between the two resonance peaks may be at least 1000 Hz. In some embodiments, the two resonance peaks may both be between 5 Hz-30000 Hz, and the frequency difference between the two resonance peaks may be at least 2000 Hz. In some embodiments, the two resonance peaks may both be between 5 Hz-30000 Hz and the frequency difference between the two resonance peaks may be at least 3000 Hz. In some embodiments, the two resonance peaks may both be between 5 Hz and 30000 Hz, and the frequency difference between the two resonance peaks may be at least 4000 Hz. The two resonance peaks may both be between 20 Hz-20000 Hz, and the frequency difference between the two resonance peaks may be at least 400 Hz. In some embodiments, the two resonance peaks may both be between 20 Hz-20000 Hz, and the frequency difference between the two resonance peaks may be at least 1000 Hz. In some embodiments, the two resonance peaks may both be between 20 Hz-20000 Hz, and the frequency difference between the two resonance peaks may be at least 2000 Hz. In some embodiments, the two resonance peaks may both be between 20 Hz-20000 Hz, and the frequency difference between the two resonance peaks may be at least 3000 Hz. In some embodiments, the two resonance peaks may both be between 20 Hz and 20,000 Hz, and the frequency difference between the two resonance peaks may be at least 4000 Hz. The two resonance peaks may both be between 100 Hz-18000 Hz, and the frequency difference between the two resonance peaks may be at least 400 Hz. In some embodiments, the two resonance peaks may both be between 100 Hz and 18000 Hz, and the frequency difference between the two resonance peaks may be at least 1000 Hz. In some embodiments, the two resonance peaks may both be between 100 Hz and 18000 Hz, and the frequency difference between the two resonance peaks may be at least 2000 Hz. In some embodiments, the two resonance peaks may both be between 100 Hz and 18000 Hz, and the frequency difference between the two resonance peaks may be at least 3000 Hz. In some embodiments, the two resonance peaks may both be between 100 Hz and 18000 Hz, and the frequency difference between the two resonance peaks may be at least 4000 Hz. The two resonance peaks may both be between 200 Hz-12000 Hz, and the frequency difference between the two resonance peaks may be at least 400 Hz. In some embodiments, the two resonance peaks may both be between 200 Hz and 12000 Hz, and the frequency difference between the two resonance peaks may be at least 1000 Hz. In some embodiments, the two resonance peaks may both be between 200 Hz and 12000 Hz, and the frequency difference between the two resonance peaks may be at least 2000 Hz. In some embodiments, the two resonance peaks may both be between 200 Hz and 12000 Hz, and the frequency difference between the two resonance peaks may be at least 3000 Hz. In some embodiments, the two resonance peaks may both be between 200 Hz and 12000 Hz, and the frequency difference between the two resonance peaks may be at least 4000 Hz. The two resonance peaks may both be between 500 Hz-10000 Hz, and the frequency difference between the two resonance peaks may be at least 400 Hz. In some embodiments, the two resonance peaks may both be between 500 Hz and 10000 Hz, and the frequency difference between the two resonance peaks may be at least 1000 Hz. In some embodiments, both resonance peaks may be between 500 Hz and 10000 Hz, and the frequency difference between the two resonance peaks may be at least 2000 Hz. In some embodiments, both resonance peaks may be between 500 Hz and 10000 Hz, and the frequency difference between the two resonance peaks may be at least 3000 Hz. In some embodiments, the two resonance peaks may both be between 500 Hz and 10000 Hz, and the frequency difference between the two resonance peaks may be at least 4000 Hz. In this way, the resonance response ranges of the loudspeaker apparatus may be widened, and the sound quality satisfying certain conditions may be obtained. It should be noted that, in actual use, a plurality of vibration conductive plates and vibration plates may be provided to form a multilayer vibration structure that corresponds to different frequency response ranges, which may realize high-quality loudspeaker vibration in the full range and frequency, or make the frequency response curve meet the requirements in some specific frequency ranges. For example, in bone conduction hearing aids, in order to meet normal hearing requirements, earphone cores composed of one or more vibration plates and vibration conductive plates with resonance frequencies in the range of 100 Hz-10000 Hz may be selected. The description of the composite vibration component composed of the vibration plate and the vibration conductive plate may be found in, e.g., Chinese Patent Application No. 201110438083.9 entitled “Bone conduction loudspeaker and its composite vibration component” filed on Dec. 23, 2011, the contents of which are hereby incorporated by reference.

Figure 16:
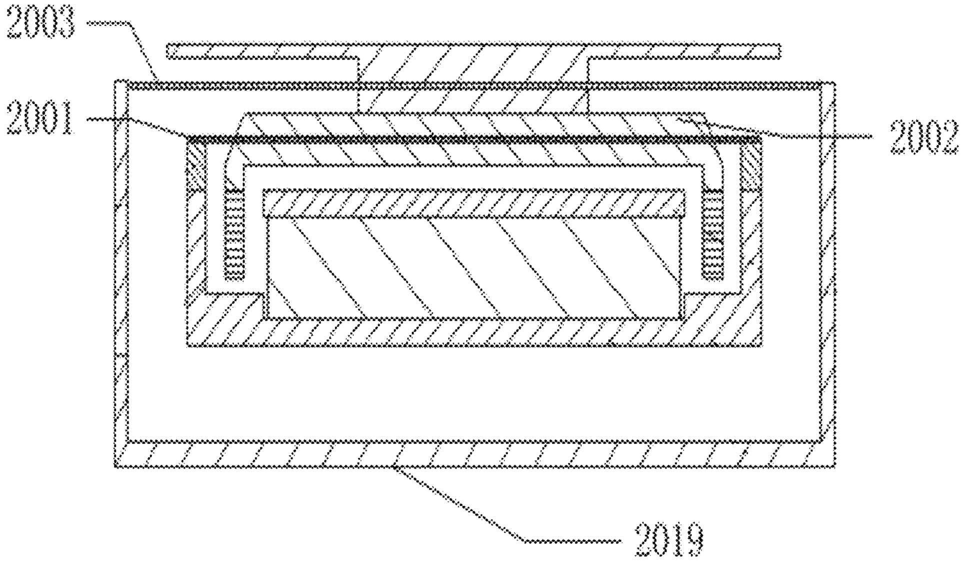
FIG. 16 is a structural diagram of an MP3 player and a composite vibration component thereof according to some embodiments of the present disclosure.

FIG. 16 is a structural diagram of an MP3 player and a composite vibration component thereof according to some embodiments of the present disclosure. As shown in FIG. 16, in some embodiments, the composite vibration component includes a vibration plate 2002, a first vibration conductive plate 2003, and a second vibration conductive plate 2001. The first vibration conductive plate 2003 fixes the vibration plate 2002 and the second vibration conductive plate 2001 on a housing 2019. The composite vibration component composed of the vibration plate 2002, the first vibration conductive plate 2003, and the second vibration conductive plate 2001 may produce not less than two resonance peaks. A flatter frequency response curve is generated within an audible range of the auditory system, thereby improving the sound quality of the loudspeaker.

Figure 17:
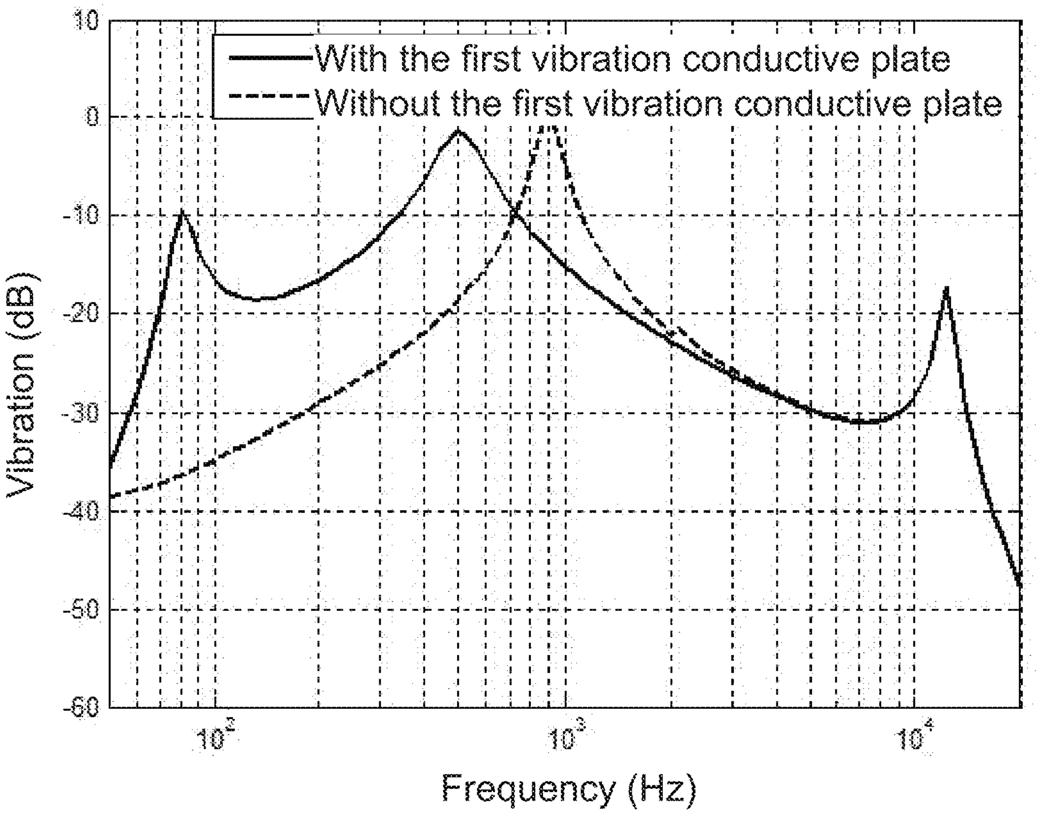
FIG. 17 is a diagram of vibration response curves of an MP3 player according to some embodiments of the present disclosure.

The count of resonance peaks generated by the triple composite vibration system of the first vibration conductive plate may be more than the count of resonance peaks generated by the composite vibration system without the first vibration conductive plate. In some embodiments, the triple composite vibration system may produce at least three resonance peaks. In some embodiments, at least one resonance peak may not be within the frequency range of sound perceivable by the human ear. In some embodiments, all the resonance peaks may be within the frequency range of sound perceivable by the human ears. In some embodiments, all the resonance peaks may be within the frequency range of sound perceivable by the human ears, and their frequencies may not be greater than 18000 Hz. In some embodiments, all the resonance peaks may be within the frequency range of sound perceivable by the human ear, and their frequencies may be between 100 Hz-15000 Hz. In some embodiments, all the resonance peaks may be within the frequency range of sound perceivable by the human ears, and their frequencies may be between 200 Hz-12000 Hz. In some embodiments, all the resonance peaks may be within the frequency range of sound perceivable by the human ears, and their frequencies may be between 500 Hz and 11000 Hz. The frequencies of the resonance peaks may have a certain gap. For example, the frequency difference between at least two resonance peaks may be at least 200 Hz. In some embodiments, the frequency difference between at least two resonance peaks may be at least 500 Hz. In some embodiments, the frequency difference between at least two resonance peaks may be at least 1000 Hz. In some embodiments, the frequency difference between at least two resonance peaks may be at least 2000 Hz. In some embodiments, the frequency difference between at least two resonance peaks may be at least 5000 Hz. In order to achieve better results, all the resonance peaks may be within the frequency range of sound perceivable by the human ears, and the frequency difference between at least two resonance peaks may be at least 500 Hz. In some embodiments, all the resonance peaks may be within the frequency range of sound perceivable by the human ears, and the frequency difference between at least two resonance peaks may be at least 1000 Hz. In some embodiments, all the resonance peaks may be within the frequency range of sound perceivable by the human ears, and the frequency difference between at least two resonance peaks may be at least 1000 Hz. In some embodiments, all the resonance peaks may be within the frequency range of sound perceivable by the human ears, and the frequency difference between at least two resonance peaks may be at least 2000 Hz. In some embodiments, all the resonance peaks may be within the frequency range of sound perceivable by the human ears, and the frequency difference between at least two resonance peaks may be at least 3000 Hz. In some embodiments, all the resonance peaks may be within the frequency range of sound perceivable by the human ears, and the frequency difference between at least two resonance peaks may be at least 4000 Hz. Two of the resonance peaks may be within the frequency range of sound perceivable by the human ears, and the other may not be within the frequency range of sound perceivable by the human ears, and the frequency difference between at least two resonance peaks may be at least 500 Hz. In some embodiments, two of the resonance peaks may be within the frequency range of sound perceivable by the human ears and the other resonance peak may not be within the frequency range of sound perceivable by the human ears, and the frequency difference between at least two resonance peaks may be at least 1000 Hz. In some embodiments, two of the resonance peaks may be within the frequency range of sound perceivable by the human ears and the other resonance peak may not be within the frequency range of sound perceivable by the human ears, and the frequency difference between at least two resonance peaks may be at least 2000 Hz. In some embodiments, two of the resonance peaks may be within the frequency range of sound perceivable by the human ears and the other resonance peak may not be within the frequency range of sound perceivable by the human ears, and the frequency difference between at least two resonance peaks may be at least 3000 Hz. In some embodiments, two of the resonance peaks may be within the frequency range of sound perceivable by the human ears and the other resonance peak may not be within the frequency range of sound perceivable by the human ears, and the frequency difference between at least two resonance peaks may be at least 4000 Hz. One of the resonance peaks may be within the frequency range of sound perceivable by the human ears, the other two resonance peaks may not be within the frequency range of sound perceivable by the human ears, and the frequency difference between at least two resonance peaks may be at least 500 Hz. In some embodiments, one of the harmonic peaks may be within the frequency range of sound perceivable by the human ears and the other two resonance peaks may not be within the frequency range of sound perceivable by the human ears, and the frequency difference between at least two resonance peaks may be at least 1000 Hz. In some embodiments, one of the resonance peaks may be within the frequency range of sound perceivable by the human ears and the other two resonance peaks may not be within the frequency range of sound perceivable by the human ears, and the frequency difference between at least two resonance peaks may be at least 2000 Hz. In some embodiments, one of the resonance peaks may be within the frequency range of sound perceivable by the human ears and the other two resonance peaks may not be within the frequency range of sound perceivable by the human ears, and the frequency difference between at least two resonance peaks may be at least 3000 Hz. In some embodiments, one of the resonance peaks may be within the frequency range of sound perceivable by the human ears and the other two resonance peaks may not be within the frequency range of sound perceivable by the human ears, and the frequency difference between at least two resonance peaks may be at least 4000 Hz. The resonance peaks may all be between 5 Hz-30000 Hz, and the frequency difference between at least two resonance peaks may be at least 400 Hz. In some embodiments, the resonance peaks may all be between 5 Hz-30000 Hz, and the frequency difference between at least two resonance peaks may be at least 1000 Hz. In some embodiments, the resonance peaks may all be between 5 Hz-30000 Hz, and the frequency difference between at least two resonance peaks may be at least 2000 Hz. In some embodiments, the resonance peaks may all be between 5 Hz-30000 Hz, and the frequency difference between at least two resonance peaks may be at least 3000 Hz. In some embodiments, the resonance peaks may all be between 5 Hz-30000 Hz, and the frequency difference between at least two resonance peaks may be at least 4000 Hz. The resonance peaks may all be between 20 Hz-20000 Hz, and the frequency difference between at least two resonance peaks may be at least 400 Hz. In some embodiments, the resonance peaks may all be between 20 Hz-20000 Hz, and the frequency difference between at least two resonance peaks may be at least 1000 Hz. In some embodiments, the resonance peaks may all be between 20 Hz-20000 Hz, and the frequency difference between at least two resonance peaks may be at least 2000 Hz. In some embodiments, the resonance peaks may all be between 20 Hz-20000 Hz, and the frequency difference between at least two resonance peaks may be at least 3000 Hz. In some embodiments, the resonance peaks may all be between 20 Hz-20000 Hz, and the frequency difference between at least two resonance peaks may be at least 4000 Hz. The resonance peaks may all be between 100 Hz-18000 Hz, and the frequency difference between at least two resonance peaks may be at least 400 Hz. In some embodiments, the resonance peaks may all be between 100 Hz-18000 Hz, and the frequency difference between at least two resonance peaks may be at least 1000 Hz. In some embodiments, the resonance peaks may all be between 100 Hz-18000 Hz, and the frequency difference between at least two resonance peaks may be at least 2000 Hz. In some embodiments, the resonance peaks may all be between 100 Hz-18000 Hz, and the frequency difference between at least two resonance peaks may be at least 3000 Hz. In some embodiments, the resonance peaks may all be between 100 Hz-18000 Hz, and the frequency difference between at least two resonance peaks may be at least 4000 Hz. The resonance peaks may all be between 200 Hz-12000 Hz, and the frequency difference between at least two resonance peaks may be at least 400 Hz. In some embodiments, the resonance peaks may all be between 200 Hz-12000 Hz, and the frequency difference between at least two resonance peaks may be at least 1000 Hz. In some embodiments, the resonance peaks may all be between 200 Hz-12000 Hz, and the frequency difference between at least two resonance peaks may be at least 2000 Hz. In some embodiments, the resonance peaks may all be between 200 Hz-12000 Hz, and the frequency difference between at least two resonance peaks may be at least 3000 Hz. In some embodiments, the resonance peaks may all be between 200 Hz-12000 Hz, and the frequency difference between at least two resonance peaks may be at least 4000 Hz. The resonance peaks may all be between 500 Hz-10000 Hz, and the frequency difference between at least two resonance peaks may be at least 400 Hz. In some embodiments, the resonance peaks may all be between 500 Hz-10000 Hz, and the frequency difference between at least two resonance peaks may be at least 1000 Hz. In some embodiments, the resonance peaks may all be between 500 Hz-10000 Hz, and the frequency difference between at least two resonance peaks may be at least 2000 Hz. In some embodiments, the resonance peaks may all be between 500 Hz-10000 Hz, and the frequency difference between at least two resonance peaks may be at least 3000 Hz. In some embodiments, the resonance peaks may all be between 500 Hz-10000 Hz, and the frequency difference between at least two resonance peaks may be at least 4000 Hz. In one embodiment, by using a triple composite vibration system composed of a vibration plate, a first vibration conductive plate and a second vibration conductive plate, the frequency response as shown in FIG. 17 can be obtained, which generates three distinct resonance peaks, and further greatly improves the sensitivity of the loudspeaker in the low frequency range (about 600 Hz) and improves the sound quality.

By changing parameters such as the size and material of the first vibration conductive plate, the position of the resonance peak may be moved to obtain a more ideal frequency response. In some embodiments, the first vibration conductive plate may be an elastic plate. The elasticity may be determined by various aspects such as the material, thickness, and structure of the first vibration conductive plate. The material of the first vibration conductive plate may include but is not limited to, steel (such as but not limited to stainless steel, carbon steel, etc.), light alloy (such as but not limited to aluminum alloy, beryllium copper, magnesium alloy, titanium alloy, etc.), and plastic (such as but not limited to high molecular polyethylene, blown nylon, engineering plastics, etc.), or other single or composite materials capable of achieving the same performance. The composite materials may include, but are not limited to, reinforcement materials such as glass fiber, carbon fiber, boron fiber, graphite fiber, graphene fiber, silicon carbide fiber, or aramid fiber; compounds of organic and/or inorganic materials such as glass fiber reinforced unsaturated polyester, various types of glass steel composed of epoxy resin or phenolic resin. The thickness of the first vibration conductive plate may not be less than 0.005 mm. In some embodiments, the thickness may be 0.005 mm-3 mm. In some embodiments, the thickness may be 0.01 mm-2 mm. In some embodiments, the thickness may be 0.01 mm-1 mm. In some embodiments, the thickness may be 0.02 mm-0.5 mm. The structure of the first vibration conductive plate may be disposed as a ring shape. In some embodiments, the first vibration conductive plate may include at least one ring. In some embodiments, the first vibration conductive plate may include at least two rings, such as a concentric ring, a non-concentric ring. The rings may be connected by at least two support rods that radiate from the outer ring to the center of the inner ring. In some embodiments, the first vibration conductive plate may include at least one elliptical ring. In some embodiments, the first vibration conductive plate may include at least two elliptical rings. Different elliptical rings may have different radii of curvature. In some embodiments, the first vibration conductive plate may include at least one square ring. The structure of the first vibration conductive plate may be disposed as a sheet shape. In some embodiments, a hollow pattern may be disposed on the first vibration conduction plate, and the area of the hollow pattern may not be less than the area without the hollow pattern. The materials, thickness, and structure described above may be combined into different vibration conductive plates. For example, a ring-shaped vibration conductive plate may have different thickness distributions. In some embodiments, the thickness of the support rod(s) may be equal to the thickness of the ring(s). In some embodiments, the thickness of the support rod(s) may be greater than the thickness of the ring(s). In some embodiments, the thickness of the inner ring may be greater than the thickness of the outer ring.

Figure 18:
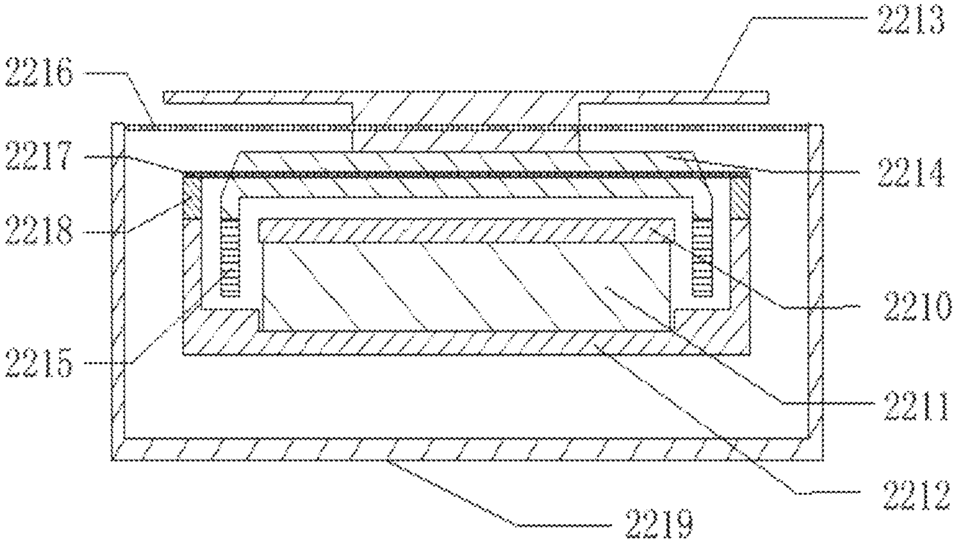
FIG. 18 is a structural diagram of a vibration generating component of an MP3 player according to some embodiments of the present disclosure.

The content disclosed in the present disclosure also discloses specific embodiments about the vibration plate, the first vibration conductive plate, and the second vibration conductive plate for the content set forth above. FIG. 18 is a structural diagram of a vibration generating component of an MP3 player according to some embodiments of the present disclosure. As shown in FIG. 18, the earphone core includes a magnetic circuit system composed of a magnetic conduction plate 2210, a magnet 2211, and a magnetic conductive material 2212, a vibration plate 2214, a coil 2215, a first vibration conductive plate 2216, and a second vibration conductive plate 2217. The panel 2213 (that is, the side of the core housing close to the user) protrudes from the housing 2219 and is bonded with the vibrating board 2214 by glue. The first vibration conductive plate 2216 connects and fixes the earphone core to the housing 2219 to form a suspension structure.

Figure 19:
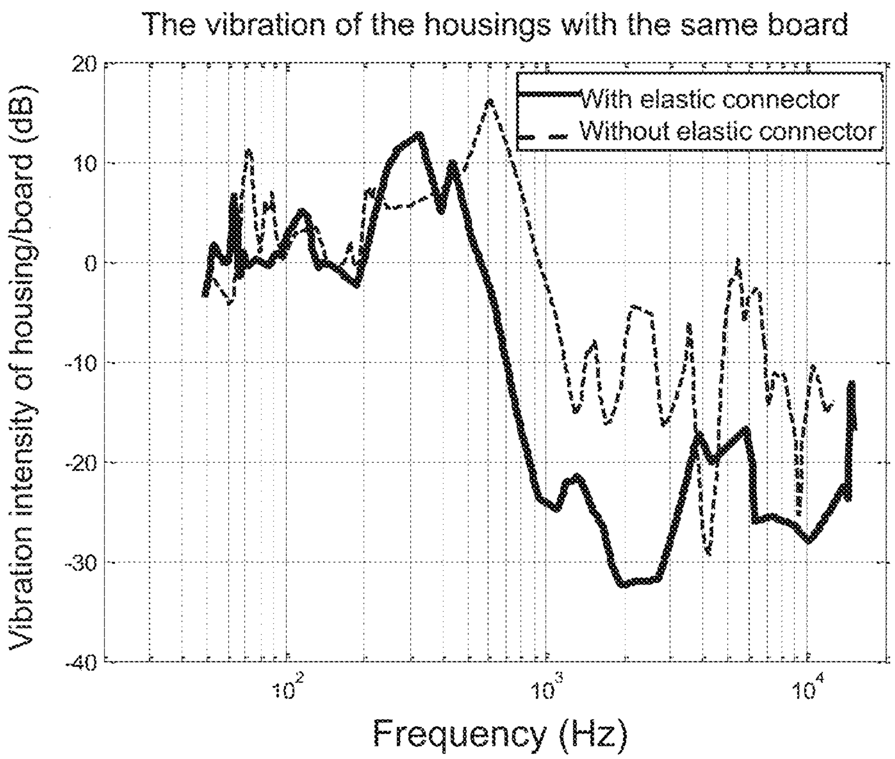
FIG. 19 is a diagram of vibration response curves of a vibration generating component of an MP3 player according to some embodiments of the present disclosure.
Figure 20:
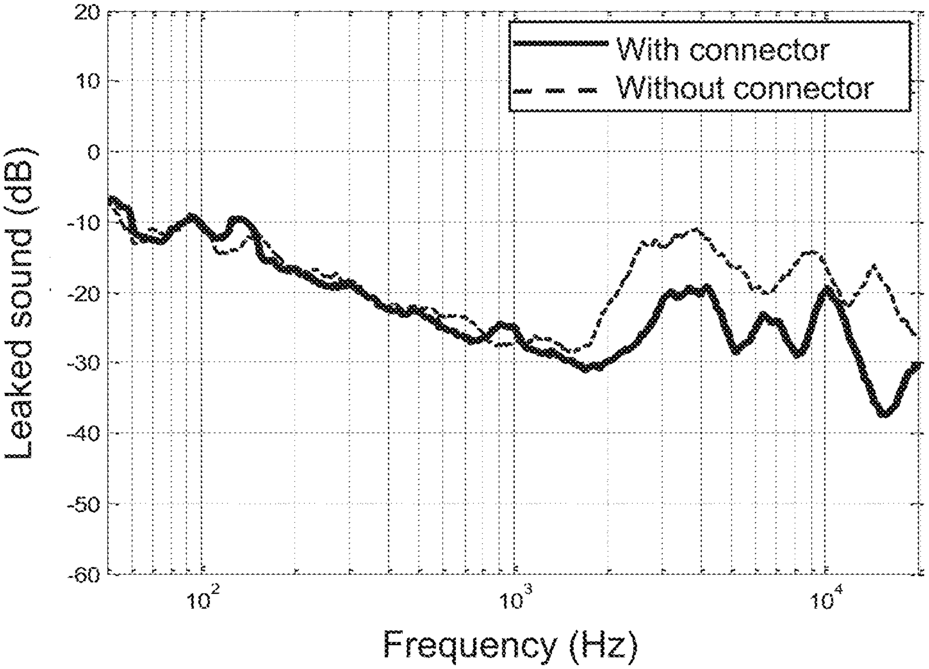
FIG. 20 is a diagram of vibration response curves of a vibration generating component of an MP3 player according to some embodiments of the present disclosure.

During the working of the bone conductive MP3 player, a triple vibration system composed of the vibration plate 2214, the first vibration conductive plate 2216, and the second vibration conductive plate 2217 may produce a flatter frequency response curve, thereby improving the sound quality of the bone conductive MP3 player. The first vibration conductive plate 2216 elastically connects the earphone core to the housing 2219, which may reduce the vibration transmitted by the earphone core to the housing, thereby effectively reducing a leaked sound caused by the vibration of the housing, and also reducing the influence of the vibration of the housing on the sound quality of the bone conductive MP3 player. FIG. 19 is a diagram of vibration response curves of a vibration generating component of an MP3 player according to some embodiments of the present disclosure. As used herein, the thick line shows the frequency response of the vibration generating component when the first vibration conductive plate 2216 is used, and the thin line shows the frequency response of the vibration generating component when the first vibration conductive plate 2216 is not used. It may be seen that the vibration of the housing of the bone conductive MP3 player without the first vibration conductive plate 2216 is significantly greater than the vibration of the housing of the bone conductive MP3 player with the first vibration conductive plate 2216 in a frequency range above 500 Hz. FIG. 20 is a comparison of a leaked sound in a case of including the first vibration conductive plate 2216 and in a case of excluding the first vibration conductive plate 2216. The leaked sound of the loudspeaker apparatus having the first vibration conductive plate 2216 in the intermediate frequency (e.g., about 1000 Hz) is less than the leaked sound of the loudspeaker apparatus without the first vibration conductive plate 2216 in the corresponding frequency range. In some embodiments, when the first vibration conductive plate is used between the panel and the housing, the vibration of the housing may be effectively reduced, thereby reducing the leaked sound. In some embodiments, the first vibration conductive plate may be a material including stainless steel, beryllium copper, plastic, polycarbonate materials, etc. The thickness of the first vibration conductive plate may be in the range of 0.01 mm-1 mm.

It should be noted that the above illustration of the bone conductive MP3 player is only a specific example and should not be regarded as the only feasible implementation. Obviously, for those skilled in the art, after understanding the basic principles of the bone conductive MP3 player, they may make various amendments and changes in forms and details of the specific methods and steps of implementing the bone conductive MP3 player without departing from the principle, but the amendments and changes are still within the scope of the above description. For example, the first vibration conductive plate is not limited to one or two rings described above, and the number thereof may also be two or more. As another example, the shapes of a plurality of elements of the first vibration conductive plate may be the same or different (the elements include a circular ring and a square ring). Such deformations are all within the protection scope of the present disclosure.

Referring to FIG. 12, the transfer relationship K2 between the sensing terminal 1102 and the vibration unit 1103 may also affect the frequency response of the bone conductive MP3 player. The sound heard by the human ear depends on the energy received by the cochlea. The energy is affected by different physical quantities during the transmission process, and may be expressed by the following equation (4):

$$P=\iint_S \alpha\cdot f(a,R)\cdot L\cdot ds \tag{4}$$

where, P is proportional to the energy received by the cochlea, S is the contact area between the contact surface and the face, α is a coefficient of dimensional conversion, f (a, R) represents the impact of the acceleration a at a point on the contact area and the closeness R between the contact area and the skin on the energy transmission, and L is the transmission impedance of mechanical wave at any contact point, that is, L is the transmission impedance per unit area.

It may be seen from (4) that the sound transmission is affected by the transmission impedance L and the vibration transmission efficiency of the bone conductive MP3 player is related to L. The frequency response curve of the bone conductive MP3 player is the superposition of the frequency response curve of each point on the contact area. The factors that change the impedance include the size, shape, roughness, force size, force distribution, etc. of the energy transmission area. For example, the sound transmission effect may be changed by changing the structure and shape of the vibration unit, and then the sound quality of the bone conductive MP3 player may be changed. Merely by way of example, changing the corresponding physical characteristics of the contact area of the vibrating unit may achieve the effect of changing the sound transmission.

Figure 21:
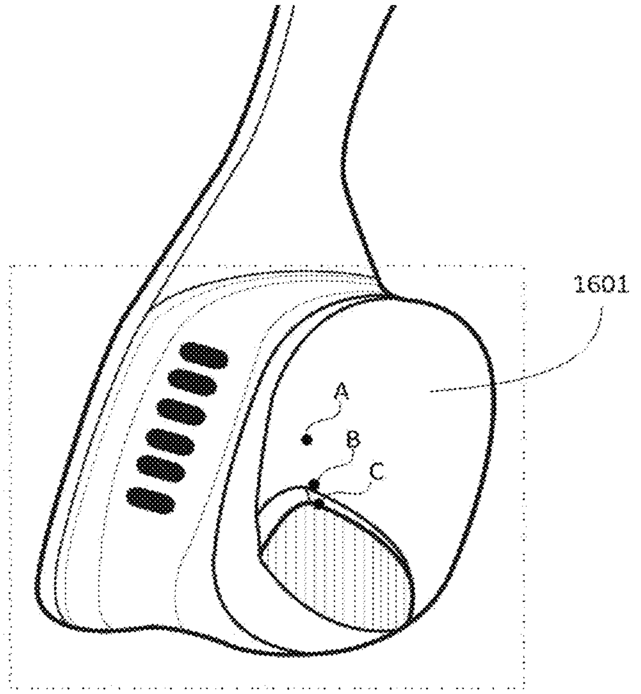
FIG. 21 is a schematic diagram of a contact area of a vibration unit of an MP3 player according to some embodiments of the present disclosure.

FIG. 21 is a schematic diagram of a contact area of a vibration unit of an MP3 player according to some embodiments of the present disclosure. In some embodiments, the contact area of the vibration unit in FIG. 21 is equivalent to the outer wall of the core housing 20 in FIG. 2 that is in contact with the human body. The embodiment is a concrete embodiment of the transfer relationship K2 between the sensing terminal 1102 and the vibration unit 1103. As shown in FIG. 21, a surface of the contact area may be disposed with a gradient structure. The gradient structure may refer to a region with a highly variable surface. The gradient structure may include a convex/concave or stepped structure located outside the contact area (the side that contacts to the user) or a convex/concave or stepped structure located inside the contact area (the side facing away from the user). In some embodiment, the contact area of the vibration unit may contact any position of the head of the user (e.g., the top of the head, forehead, cheeks, horns, auricle, back of auricle, etc.). As shown in FIG. 21, the contact area 1601 (outside the contact area) has a convex or concave part (not shown in FIG. 21). During the work of the bone conductive MP3 player, the convex or concave part may be in contact with the user, changing the pressure when different positions on the contact area 1601 contact the face. The convex part may be in closer contact with the face of the human. The skin and subcutaneous tissue in contact with the convex part may be subjected to more pressure than that in contact with other parts. Accordingly, the skin and subcutaneous tissue in contact with the concave part may be subjected to less pressure than that in contact with other parts. For example, there are three points A, B, and C on the contact area 1601 in FIG. 21, which are respectively located on the non-convex part, the edge of the convex part, and the convex part of the contact area 1601. During in contact with the skin, the clamping force on the skin at the three points A, B, and C is FC>FA>FB. In some embodiments, the clamping force of point B may be 0, that is, point B may not be in contact with the skin. The skin and subcutaneous tissue may show different impedances and responses to sound under different pressures. The impedance ratio may be small at the part with a high pressure, which has a high-pass filtering characteristic for sound waves. The impedance ratio may be large at the part with a low pressure, which has a low-pass filtering characteristic. The impedances L of each part of the contact area 1601 may be different. According to Equation (4), different parts may have different responses to the frequency of sound transmission. The effect of sound transmission through the entire contact area may be equivalent to the sum of sound transmission at each part of the contact area. When the sound is transmitted to the brain, a smooth frequency response curve may be formed, which avoids the occurrence of excessively high resonance peaks at low frequency or high frequency, thereby obtaining an ideal frequency response within the entire sound frequency bandwidth. Similarly, the material and thickness of the contact area 1601 may affect sound transmission, which further affects the sound quality. For example, when the material of the contact area is soft, the effect of sound transmission in the low frequency range may be better than that in the high frequency range. When the material of the contact area is hard, the effect of sound transmission effect in the high frequency range may be better than that in the low frequency range.

Figure 22:
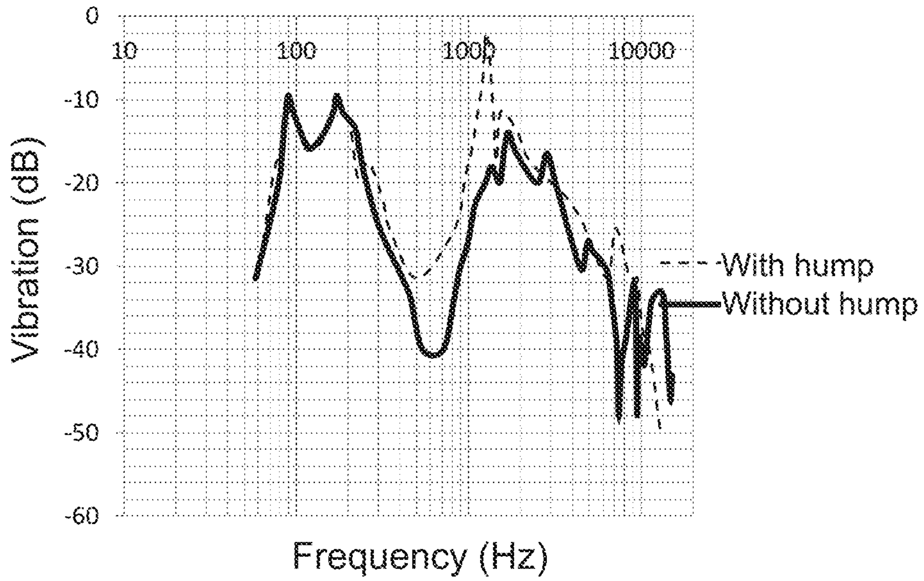
FIG. 22 is a diagram of vibration response curves of a loudspeaker of an MP3 player according to some embodiments of the present disclosure.

FIG. 22 is a diagram of frequency response curves of an MP3 player with different contact areas. The dashed line corresponds to the frequency response curve of a loudspeaker with a convex structure on the contact area, and the solid line corresponds to the frequency response curve of a loudspeaker with no convex structure on the contact area. In the mid-low frequency range (e.g., in the frequency range of 300 Hz-1000 Hz), the vibration of loudspeaker apparatus without the convex structure may be significantly weakened compared with the vibration of loudspeaker apparatus having the convex structure, forming a "deep pit" on the frequency response curve, which appears to be a non-ideal frequency response, so as to affect the sound quality of the MP3 player.

The illustration of FIG. 22 described above is only an explanation of specific examples. For those skilled in the field, after understanding the basic principles that affect the frequency response of the MP3 player, various amendments and changes may be made to the structure and components of the MP3 player, so as to obtain different effects of frequency response.

It should be noted that, for those having ordinary skills in the art, the shape and structure of the contact area 1601 is not limited to the above description, and may meet other specific requirements. For example, the convex or concave part on the contact area may be distributed on the edge of the contact area, or be distributed in the middle of the contact area. The contact area may include one or more convex or concave parts. The convex and concave parts may be distributed on the contact area at the same time. The material of the convex or concave parts on the contact area may be other materials different from the material of the contact area. The material of the convex or concave parts may be flexible material, rigid material, or more suitable material for generating a specific pressure gradient; or may be memory or non-memory material; or may be a single material or a composite material. The structural graphics of the convex or concave part of the contact area may include axisymmetric graphics, center-symmetric graphics, rotational symmetric graphics, asymmetric graphics, or the like. The structural graphics of the convex or concave part of the contact area may be one kind of graphics, or a combination of two or more kinds of graphics. The surface of the contact area may have a degree of smoothness, roughness, and waviness. The position distribution of the convex or concave part of the contact area may include, but is not limited to, axial symmetry distribution, center symmetry distribution, rotational symmetry distribution, asymmetric distribution, etc. The convex or concave part of the contact area may be on the edge of the contact area, or be distributed inside the contact area.

Figure 23:
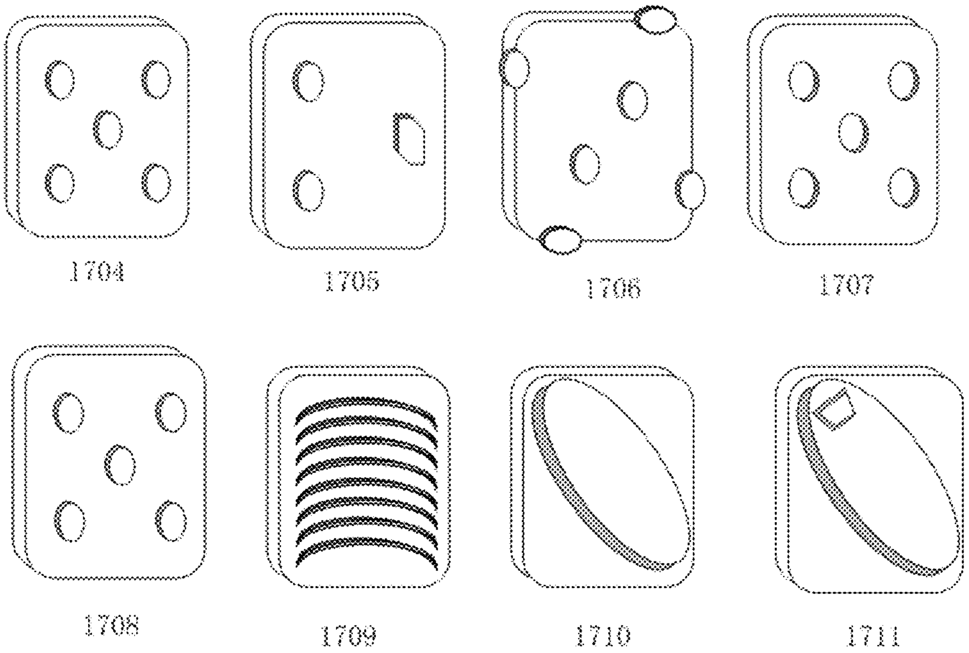
FIG. 23 is a schematic diagram of contact areas of a vibration unit of an MP3 player according to some embodiments of the present disclosure.

FIG. 23 is a schematic diagram of contact areas of a vibration unit of an MP3 player according to some embodiments of the present disclosure. As shown in FIG. 23, the figure shows various exemplary structures of the contact area. Schematic diagram 1704 shown in FIG. 23 is an example illustrating a plurality of convexes (also referred to as convex parts) with similar shapes and structures on the contact area. The convexes may be made of the same or similar materials as the other parts of the panel, or be made of different materials from the other parts of the panel. In particular, the convexes may be composed of a memory material and a vibration transmission layer material, and the proportion of the memory material may not be less than 10%. In some embodiments, the proportion of the memory material in the convexes may not be less than 50%. The area of a single convex may account for 1%-80% of the total area of the contact area. In some embodiments, the area of the single convex may account for 5%-70% of the total area of the contact area. More In some embodiments, the area of the single convex may account for 8%-40% of the total area of the contact area. The area of all convexes may account for 5%-80% of the total area of the contact area. In some embodiments, the area of all convexes may account for 10%-60% of the total area of the contact area. There may be at least one convex. In some embodiments, there may be one convex. In some embodiments, there may be two convexes. In some embodiments, there may be at least five convexes. The shape of the convex(es) may be a circle, an oval, a triangle, a rectangle, a trapezoid, an irregular polygon, or other similar graphics. The structure of the convexes (or the convex parts) may be symmetrical or asymmetrical. The position distribution of the convexes (or the convex parts) may be symmetrical or asymmetrical. The count of convexes (or the convex parts) may be one or more. The heights of the convexes (or the convex parts) may be or may not be the same. The heights and distribution of the convexes (or the convex parts) may constitute a certain gradient.

Schematic diagram 1705 shown in FIG. 23 is an example illustrating a structure of convexes (or convex parts) on the contact area that includes two or more graphics. The count of convexes with different graphics may be one or more. Two or more shapes (or graphics) of the convexes may be any two or more combinations of a circle, an oval, a triangle, a rectangle, a trapezoid, an irregular polygon, or other similar graphics. The material, quantity, area, symmetry, etc. of the convexes may be similar to those in schematic diagram 1704.

Schematic diagram 1706 shown in FIG. 23 is an example illustrating a plurality of convexes (or convex parts) distributed at the edge and inside of the contact area. The count of the convexes may not be limited to that shown in FIG. 23. The ratio of the count of convexes located at the edge of the contact area to the total count of convexes may be 1%-80%. In some embodiments, the ratio may be 5%-70%. In some embodiments, the ratio may be 10%-50%. In some embodiments, the ratio may be 30%-40%. The material, quantity, area, shape, symmetry, etc. of the convexes may be similar to those in schematic diagram 1704.

Schematic diagram 1707 shown in FIG. 23 is an example illustrating a structure of concave parts on the contact area. The structure of the concave parts may be symmetrical or asymmetrical. The position distribution of the concave parts may be symmetrical or asymmetrical. The count of concave parts may be one or more. The shape of the concave parts may be the same or different. The concave parts may be hollow. The area of a single concave part may account for 1%-80% of the total area of the contact area. In some embodiments, the area of the single concave part may account for 5%-70% of the total area of the contact area. In some embodiments, the area of the single concave part may account for 8%-40% of the total area of the contact area. The area of all the concave parts may account for 5%-80% of the total area of the contact area. In some embodiments, the area of all the concave parts may account for 10%-60% of the total area of the contact area. There may be at least one concave parts. In some embodiments, there may be one concave part. In some embodiments, there may be two concave parts. In some embodiments, there may be at least five concave parts. The shape of the concave part(s) may include a circle, an oval, a triangle, a rectangle, a trapezoid, an irregular polygon, or other similar graphics.

Schematic diagram 1708 shown in FIG. 23 is an example where a contact area has both convex parts and concave parts. The count of convex parts and/or concave parts may not be limited to one or more. The ratio of the count of concave parts to the count of convex parts may be 0.1-100. In some embodiments, the ratio may be 1-80. In some embodiments, the ratio may be 5-60. In some embodiments, the ratio may be 10-20. The material, the area, the shape, the symmetry, etc. of a single convex part/concave part may be similar to those in schematic diagram 1704.

Schematic diagram 1709 in FIG. 23 is an example of a contact area with a certain count of ripples. The ripples may be generated by combining more than two convex parts/concave parts, or combining the convex parts and the concave parts. In some embodiments, the distance between adjacent convex parts/concave parts may be equal. In some embodiments, the distance between the convex parts/concave parts may be arranged equally.

Schematic diagram 1710 in FIG. 23 is an example of a contact area having a convex (or convex part) with a large area. The area of the convex may account for 30%-80% of the total area of the contact area. In some embodiments, part of the edge of the convex may be substantially in contact with part of the edge of the contact area.

Schematic diagram 1711 in FIG. 23 is an example of a contact area having a first convex (or convex part) with a larger area and a second convex with a smaller area on the first convex. The larger area of the convex may account for 30%-80% of the total area of the contact area. The smaller area of the convex may account for 1%-30% of the total area of the contact area. In some embodiments, the smaller area of the convex may account for 5%-20% of the total area of the contact area. The smaller area may account for 5%-80% of the larger area. In some embodiments, the smaller area may account for 10%-30% of the larger area.

The above description of the structure of the contact area of the MP3 player is only a specific example, and should not be regarded as the only feasible implementation solution. Obviously, for persons having ordinary skills in the art, after understanding the basic principle that the structure of the contact area will affect the sound quality of the MP3 player, various modifications and changes may be made in the forms and details of the specific ways of implementing the contact area of the MP3 player without departing from the principle, but these modifications and changes are still within the scope of the present disclosure. For example, the count of convex parts or concave parts is not limited to that shown in FIG. 23. The convex parts, the concave parts, or the surface pattern of the contact area described above may be modified to a certain extent, and these modifications are still within the protection scope of the present disclosure. Moreover, the contact area of the one or more vibration unit contained in the loudspeaker may use the same or different shapes and materials. The vibration effect transmitted on different contact areas may vary according to the property of the contact area, thereby obtaining different sound quality effects.

Figure 24:
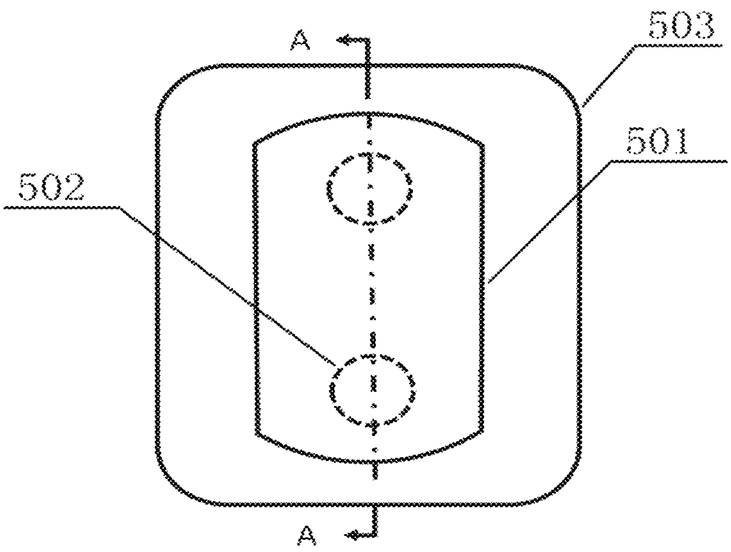
FIG. 24 is a top view of a bonding manner of a loudspeaker panel of an MP3 player according to some embodiments of the present disclosure.
Figure 25:
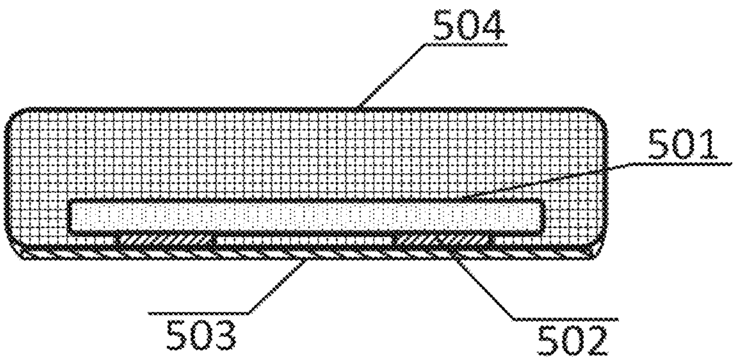
FIG. 25 is a top view of a bonding manner of a loudspeaker panel of an MP3 player according to some embodiments of the present disclosure.

FIG. 24 is a front view and side view of a panel and a vibration conductive layer. FIG. 25 is a front view and side view of a panel and a vibration conductive layer.

In some embodiments, a vibration transmission layer may be disposed at an outer surface of a sidewall of the housing 20 that contacts the human. The vibration transmission layer may be a specific embodiment of changing the physical characteristics of the contact area of the vibration unit to change the sound transmission effect. Different regions on the vibration transmission layer may have different transmission effects on vibration. For example, the vibration transmission layer may include a first contact area region and a second contact area region. In some embodiments, the first contact area region may not be attached to the panel, and the second contact area region may be attached to the panel. In some embodiments, when the vibration transmission layer is in contact with the user directly or indirectly, the clamping force on the first contact area region may be less than the clamping force on the second contact area region (the clamping force herein refers to the pressure between the contact area of the vibration unit and the user). In some embodiments, the first contact area region may not be in contact with the user directly, and the second contact area region may be in contact with the user directly and may transmit vibration. The area of the first contact area region may be different from the area of the second contact area region. In some embodiments, the area of the first contact area region may be less than the area of the second contact area region. In some embodiments, the first contact area region may include small holes to reduce the area of the first contact region. The outer surface of the vibration transmission layer (that is, the surface facing the user) may be flat or uneven. In some embodiments, the first contact area region and the second contact area region may not be on the same plane. In some embodiments, the second contact area region may be higher than the first contact area region. In some embodiments, the second contact area region and the first contact area region may constitute a stepped structure. In some embodiments, the first contact area region may be in contact with the user, and the second contact area region may not be in contact with the user. The materials of the first contact area region and the second contact area region may be the same or different. The materials of the first contact area region and/or the second contact area region may include the materials of the vibration transmission layer described above.

As shown in FIGS. 24 and 25, in some embodiments, the panel 501 and the vibration transmission layer 503 may be bonded by glue 502. The glued joints may be located at both ends of the panel 501. The panel 501 may be located in a housing formed by the vibration transmission layer 503 and the housing 504. In some embodiments, the projection of the panel 501 on the vibration transmission layer 503 may be a first contact area region, and a region located around the first contact area region may be a second contact area region.

Figure 26:
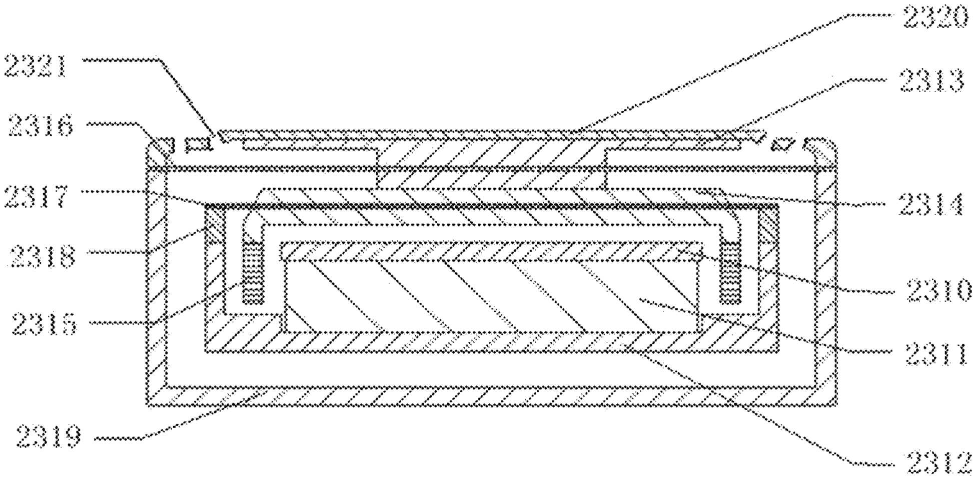
FIG. 26 is a structural diagram of a vibration generation component of a loudspeaker of an MP3 player according to some embodiments of the present disclosure.

In some embodiments, as shown in FIG. 26, the earphone core may include a magnetic circuit system consisting of a magnetic conduction plate 2310, a magnet 2311, and a magnetic conductive body 2312. The earphone core may also include a vibration plate 2314, a coil 2315, a first vibration conductive plate 2316, a second vibration conductive plate 2317, and a washer 2318. The panel 2313 may protrude from the housing 2319 and be bonded to the vibration plate 2314 by glue. The first vibration transmission plate 2316 may fix the earphone core to the housing 2319 to form a suspension structure. A vibration transmission layer 2320 (e.g., silica gel) may be added to the panel 2313, and the vibration transmission layer 2320 may generate deformation to adapt to the shape of the skin. A portion of the vibration transmission layer 2320 that is in contact with the panel 2313 may be higher than a portion of the vibration transmission layer 2320 that is not in contact with the panel 2313, thereby forming a stepped structure. One or more small holes 2321 may be disposed on the portion where the vibration transmission layer 2320 does not contact the panel 2313 (a portion where the vibration transmission layer 2320 does not protrude in FIG. 26). The small holes on the vibration transmission layer may reduce the leaked sound. Specifically, the connection between the panel 2313 and the housing 2319 through the vibration transmission layer 2320 may be weakened, and the vibration transmitted from the panel 2313 to the housing 2319 through the vibration transmission layer 2320 may be reduced, thereby reducing the leaked sound generated by the vibration of the housing 2319. The area of the non-protruding portion of the vibration transmission layer 2320 may be reduced by disposing small holes 2321, which may drive less air and reduce the leaked sound caused by air vibration. When the small holes 2321 are disposed on the non-protruding part of the vibration transmission layer 2320, the air vibration in the housing may be guided out of the housing and counteract the air vibration caused by the housing 2319, thereby reducing the leaked sound. It should be noted that, since the small holes 2321 may guide the sound waves in the housing of the composite vibration component, and the guided sound waves may be superimposed with the sound waves from the leaked sound to reduce the leaked sound, the small holes may also be the sound guiding holes.

It should be noted here that, in the embodiment, the panel may protrude from the housing of the bone conductive MP3 player. The first vibration conductive plate may be used to connect the panel and the housing of the MP3 player, and the coupling degree between the panel and the housing may be greatly reduced. The first vibration conductive plate may provide a certain deformation, so that the panel has a higher degree of freedom when the panel contacts the user, and may be better adapted to contact surfaces. The first vibration conductive plate may make the panel tilt at a certain angle relative to the housing. Preferably, the tilt angle may not exceed 50.

Figure 27:
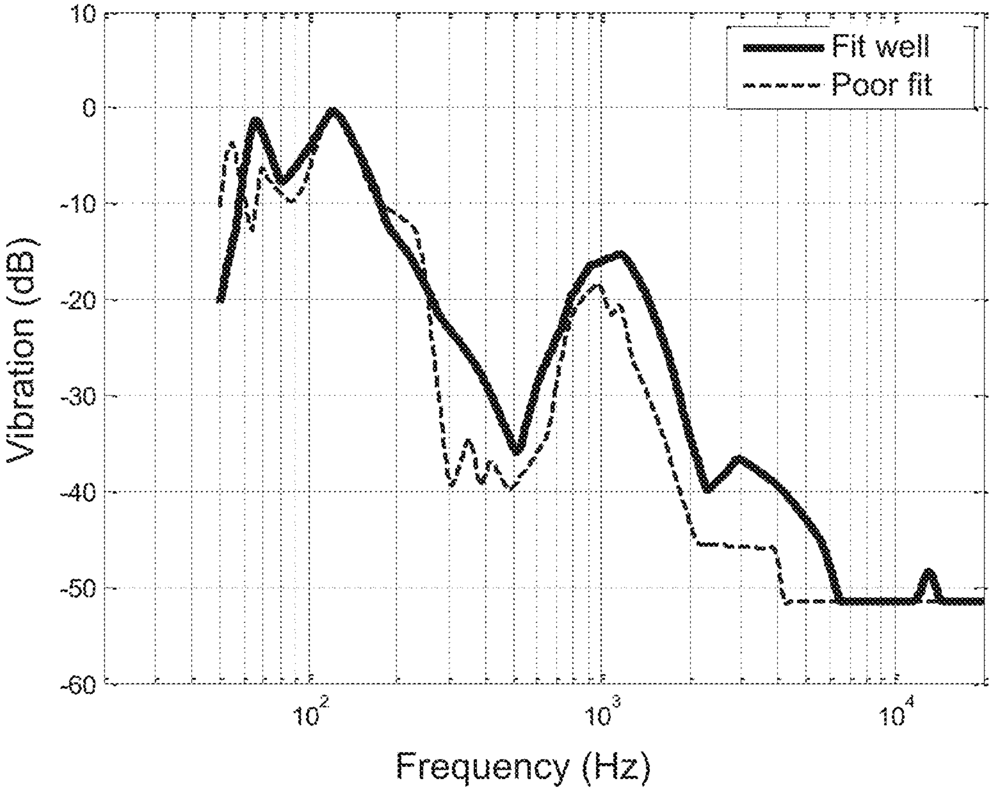
FIG. 27 is a schematic diagram of vibration response curves of a vibration generating component of a loudspeaker of an MP3 player according to some embodiments of the present disclosure.

Further, the vibration efficiency of the MP3 player may vary with the contact state. Good contact state may have higher vibration transmission efficiency. As shown in FIG. 27, the thick line shows the vibration transmission efficiency in a good contact state, and the thin line shows the vibration transmission efficiency in a poor contact state. In some embodiments, better contact state may have higher vibration transmission efficiency.

Figure 28:
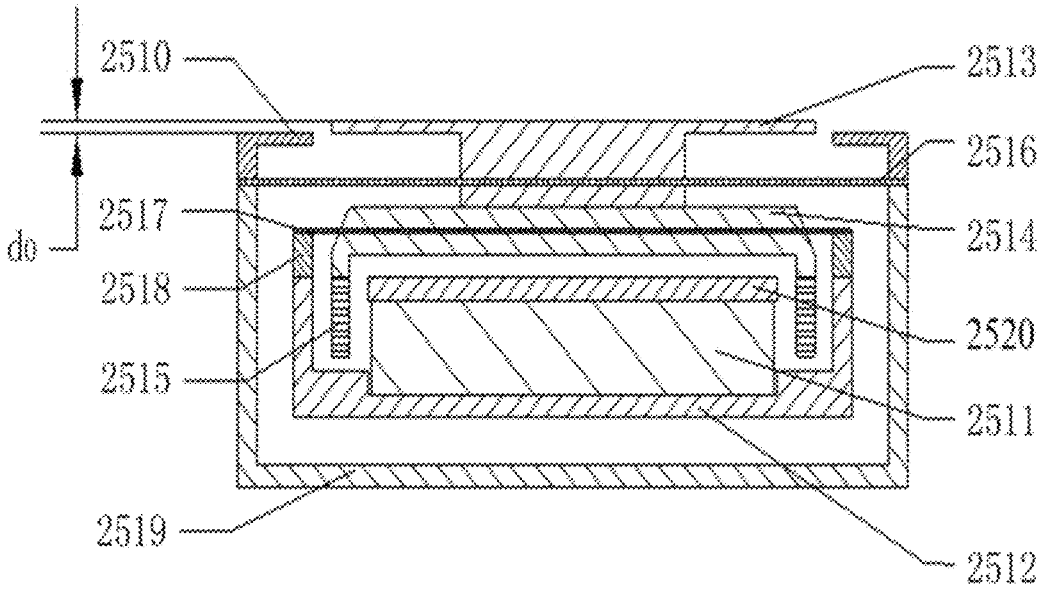
FIG. 28 is a structural diagram of a vibration generation component of a loudspeaker of an MP3 player according to some embodiments of the present disclosure.

FIG. 28 is a structural diagram of a vibration generating component of an MP3 player according to some embodiments of the present disclosure. As shown in FIG. 28, in this embodiment, the earphone core may include a magnetic circuit system composed of a magnetic conduction plate 2510, a magnet 2511 and a magnetic conduction plate 2512, a vibration plate 2514, a coil 2515, a first vibration conductive plate 2516, a second vibration conductive plate 2517, and a washer 2518. The panel 2513 may protrude from the housing 2519, and may be bonded to the vibration plate 2514 by glue. The first vibration piece 2516 may fix the earphone core to the housing 2519 to form a suspension structure.

The difference between the embodiment and the embodiment in FIG. 26 is that an edge is added to the edge of the housing. During the contact between the housing and the skin, the edge may make the force distribution more uniform and increase the wearing comfort of the MP3 player. There is a height difference do between the surrounding edge 2510 and the panel 2513. The force of the skin on the panel 2513 may reduce the distance d between the panel 2513 and the surrounding edge 2510. When the pressure between the MP3 player and the user is greater than the force that the first vibration conductive plate 2516 suffers when the deformation of the first vibration conductive plate 2516 is do, excessive clamping force will be transmitted to the skin through the surrounding edge 2510 without affecting the clamping force of the vibration part, which makes the clamping force more uniform, thereby improving the sound quality.

Under normal circumstances, the sound quality of the MP3 player is affected by various factors, such as the physical properties of the components of the MP3 player, the vibration transmission relationship among the components, the vibration transmission relationship between the MP3 player and the outside world, and the efficiency of the vibration delivery system in transmitting vibration, or the like. The components of the MP3 player may include components that generate vibrations (such as but not limited to transducers), components that fix the MP3 player (such as but not limited to hooks/earphone straps), and components that transmit vibrations (such as but not limited to panels, vibration transmission layer, etc.). The vibration transmission relationship among the components and the vibration transmission relationship between the MP3 player and the outside world are determined by the contact mode between the loudspeaker and the user (such as but not limited to clamping force, contact area, contact shape, etc.).

In some embodiments, the loudspeaker apparatus (such as MP3 player) described above may transmit sound to the user through air conduction. When transmitting the sound by means of air conduction, the loudspeaker apparatus may include one or more sound sources. The sound sources may be located at a specific position of the user's head, such as the top of the head, the forehead, the cheek, the horn, an auricle, back of an auricle, etc., which may not block or cover the ear canal. For the purpose of description, FIG. 29 is a schematic diagram illustrating a sound transmission manner through air conduction according to some embodiments of the present disclosure.

Figure 29:
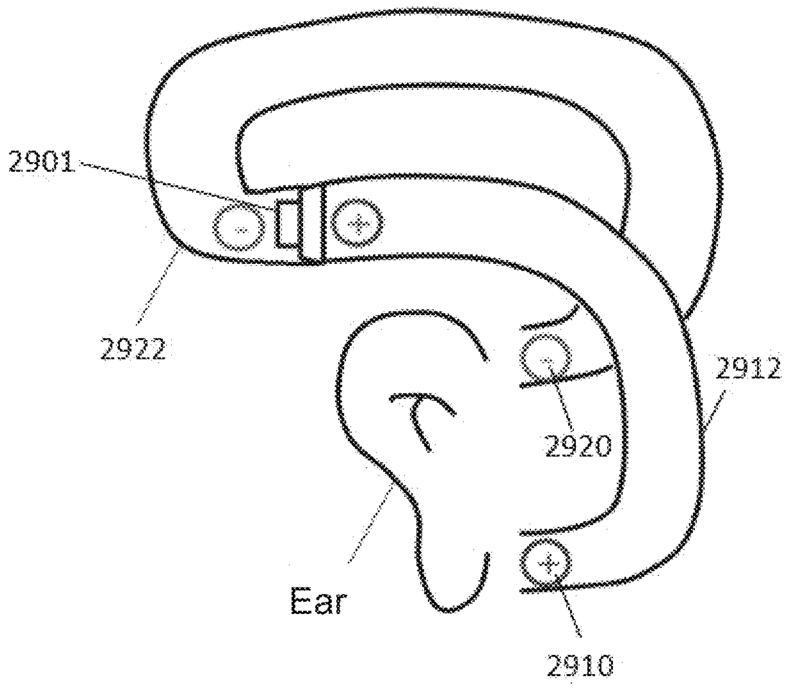
FIG. 29 is a schematic diagram of a sound transmission manner through air conduction according to some embodiments of the present disclosure.

As shown in FIG. 29, a sound source 2910 and a sound source 2920 may generate sound waves with opposite phases ("+" and "−" in the figure may indicate the opposite phases). For brevity, the sound sources mentioned herein refers to sound outlets on the loudspeaker apparatus that outputs sounds. For example, the sound source 2910 and the sound source 2920 may be two sound outlets respectively located at specific positions on the MP3 player, (for example, the core housing 20 or the circuit housing 30).

In some embodiments, the sound source 2910 and the sound source 2920 may be generated by the same vibration device 2901. The vibration device 2901 may include a diaphragm (not shown in the figure). When the diaphragm is driven to vibrate by an electric signal, the front side of the diaphragm may drive air to vibrate. The sound source 2910 may form at the sound outlet through a sound guiding channel 2912. The back of the diaphragm may drive air to vibrate, and the sound source 2920 may be formed at the sound outlet through a sound guiding channel 2922. The sound guiding channel may refer to a sound transmission route from the diaphragm to the corresponding sound outlet. In some embodiments, the sound guiding channel may be a route surrounded by a specific structure (e.g., the core housing 20, or the circuit housing 30) on the loudspeaker. It should to be known that in some alternative embodiments, the sound source 2910 and the sound source 2920 may also be generated by different vibrating diaphragms of different vibration devices, respectively.

Among the sounds generated by the sound source 2910 and the sound source 2920, part of the sound may be transmitted to the user's ear to form the sound heard by the user, and the other part may be transmitted to the environment to form the leaked sound. Considering that the sound source 2910 and the sound source 2920 are relatively close to the user's ear, for convenience of description, the sound transmitted to the user's ear may be called near-field sound, and the leaked sound transmitted to the environment may be called far-field sound. In some embodiments, the near-field/far-field sound with different frequencies generated by the loudspeaker apparatus may be related to the distance between the sound source 2910 and the sound source 2920. Generally speaking, the near-field sound generated by the loudspeaker apparatus will increase as the distance between the two sound sources increases, and the far-field sound (leaked sound) generated by the loudspeaker apparatus will increase as the increase of frequency.

For sounds with different frequencies, the distance between the sound source 2910 and the sound source 2920 may be designed separately, so that the low-frequency near-field sound generated by the loudspeaker apparatus (e.g., sound with a frequency of less than 800 Hz) may be as large as possible, and the high-frequency far-field sound (e.g., a sound with a frequency greater than 2000 Hz) may be as small as possible. In order to achieve the above purpose, the loudspeaker apparatus may include two or more sets of dual sound sources. Each set of dual sound sources may include two sound sources similar to the sound source 2910 and the sound source 2920, and respectively generate sounds with specific frequencies. Specifically, the first set of dual sound sources may be used to generate low-frequency sound, and the second set of dual sound sources may be used to generate high-frequency sound. In order to obtain a relatively large low-frequency near-field sound, the distance between two sound sources in the first set of dual sound sources may be designed to a relatively large value. Since the low-frequency signal has a longer wavelength, a relatively large distance between the two sound sources will not cause an excessive phase difference in the far field, and further will not form excessive leaked sound in the far field. In order to obtain a relatively small high-frequency far-field sound, the distance between two sound sources in the second set of dual sound sources may be designed to a relatively small value. Since the high-frequency signal has a shorter wavelength, a relatively small distance between the two sound sources may avoid forming a large phase difference in the far field, and further may avoid forming a large leaked sound. The distance between the second set of dual sound sources may be less than the distance between the first set of dual sound sources.

The possible beneficial effects of the embodiments of the present disclosure include, but are not limited to the following. (1) The circuit housing is tightly covered by the housing sheath, and the circuit housing and the housing sheath are hermetically connected, which improves the waterproof performance of the loudspeaker apparatus. (2) The elastic pad covering the outside of the keyhole may prevent the external liquid from entering the inside of the circuit housing through the keyhole, thereby realizing the sealing and waterproof performance of the key mechanism. (3) A composite vibration component and a contact area with a gradient structure may improve the sound transmission effect and improve the sound quality. (4) By adopting a panel with at least one contact area and by setting a sound guiding hole, the loudspeaker apparatus may reduce housing vibration and suppress sound leakage. It should be noted that different embodiments may have different beneficial effects. In different embodiments, the possible beneficial effects may be any one or a combination of several of the above, or any other beneficial effects that may be obtained.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures, or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," or "system." Furthermore, aspects of the present disclosure may take the form of a computer program product embodied in one or more computer-readable media having computer-readable program code embodied thereon.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A loudspeaker apparatus, comprising:

a first housing configured to accommodate an earphone core, wherein the earphone core generates sound waves that are output from two sound outlets located on the first housing, the first housing includes a sidewall facing towards a face of a user, the sidewall includes one or more convex parts;

a second housing configured to accommodate a battery that supplies power to the earphone core;

an ear hook configured to connect the first housing and the second housing;

a key, the key being arranged at a keyhole on the second housing to generate a control signal for a control circuit; and an elastic pad arranged between the key and the keyhole, wherein the second housing further comprises a main sidewall and an auxiliary sidewall connected to the main sidewall, wherein an outer surface of the auxiliary sidewall is arranged with a first recessed region, the elastic pad is located in the first recessed region, the elastic pad includes a second recessed region corresponding to the keyhole, and the second recessed region extends into the keyhole, the loudspeaker apparatus further comprises a rigid pad, the rigid pad is arranged between the elastic pad and the second housing, and is arranged with a passing hole that allows the second recessed region to pass through.

2. The loudspeaker apparatus of claim 1, wherein the one or more convex parts on the sidewall are distributed on an edge of the sidewall.

3. The loudspeaker apparatus of claim 1, wherein an area of each of the one or more convex parts accounts for 1%-30% of a total area of the sidewall.

4. The loudspeaker apparatus of claim 1, wherein the ear hook includes a protective sleeve covering around an elastic metal wire.

5. The loudspeaker apparatus of claim 4, wherein the second housing is at least partially covered by a housing sheath, and the housing sheath is integrally formed with the protective sleeve.

6. The loudspeaker apparatus of claim 5, wherein the housing sheath has a bag-like structure with one end open so that the second housing enters into the housing sheath through the open end of the housing sheath.

7. The loudspeaker apparatus of claim 1, wherein the earphone core includes at least a composite vibration component composed of a vibration plate and a second vibration conductive plate, a stiffness coefficient of the vibration plate is greater than a stiffness coefficient of the second vibration conductive plate.

8. The loudspeaker apparatus of claim 7, wherein the composite vibration component generates at least two resonance peaks both within a sound frequency range audible by human ears.

9. The loudspeaker apparatus of claim 1, wherein the key comprises a key body and a key contact, the key contact extends into the second recessed region, and the key body is arranged on a side of the key contact away from the elastic pad.

10. The loudspeaker apparatus of claim 9, wherein the key comprises at least two key units spaced apart from each other and a connection component for connecting the at least two key units, wherein each of the at least two key units is arranged with one key contact correspondingly, and the elastic pad is also arranged with an elastic bump for supporting the connection component.

11. The loudspeaker apparatus of claim 1, wherein the elastic pad and the rigid pad are fixed against each other.

12. The loudspeaker apparatus of claim 1, further comprising:

an auxiliary sheet, wherein the second housing further accommodates a key circuit board, the auxiliary sheet comprises a board and a pressing foot protruding from the board, the pressing foot is configured to press the key circuit board on an inner surface of the auxiliary sidewall.

13. The loudspeaker apparatus of claim 12, wherein the main sidewall of the second housing is arranged with at least one mounting hole, and the loudspeaker apparatus further comprises a conductive pin inserted into the mounting hole;

the board is arranged with a hollow region, wherein the board is arranged on an inner surface of the main sidewall, and the mounting hole is located inside the hollow region, so as to form a glue groove around the conductive pin.

14. The loudspeaker apparatus of claim 13, wherein the hollow region is arranged with a gap, and a strip-shaped rib corresponding to the gap is integrally formed on the inner surface of the main sidewall, so that the strip-shaped rib cooperates with the auxiliary sheet to make the glue groove closed.

15. The loudspeaker apparatus of claim 12, wherein a key switch corresponding to the keyhole is arranged on the key circuit board to allow the key contact contacts and triggers the key switch when a user presses the key.

16. The loudspeaker apparatus of claim 1, wherein the sound waves that are output from the two sound outlets located on the first housing have opposite phases.

17. The loudspeaker apparatus of claim 1, wherein the one or more convex parts include a plurality of convex parts constituting a gradient distribution on the sidewall.

18. The loudspeaker apparatus of claim 17, wherein the loudspeaker apparatus further comprises a plurality of concave parts, the plurality of concave parts have different shapes.

* * * * *